(12) United States Patent
McEwan

(10) Patent No.: US 6,492,933 B1
(45) Date of Patent: Dec. 10, 2002

(54) SSB PULSE DOPPLER SENSOR AND ACTIVE REFLECTOR SYSTEM

(75) Inventor: Thomas E. McEwan, Carmel Highlands, CA (US)

(73) Assignee: McEwan Technologies, LLC, Monterey, CA (US)

(*) Notice: Subject to any disclaimer, the term of this patent is extended or adjusted under 35 U.S.C. 154(b) by 0 days.

(21) Appl. No.: 09/388,785

(22) Filed: Sep. 2, 1999

(51) Int. Cl.[7] .................. G01S 13/74; G01S 13/08; G01S 13/53

(52) U.S. Cl. ............... 342/28; 342/27; 342/42; 342/43; 342/51; 342/89; 342/118; 342/124; 342/127; 342/134; 342/145; 342/194

(58) Field of Search .................. 342/21, 27, 28, 342/73–89, 98–104, 115, 118, 134–145, 175, 189–197, 42–45, 50, 51, 22, 119–132; 340/554, 573.4

(56) References Cited

U.S. PATENT DOCUMENTS

| | | | |
|---|---|---|---|
| 3,568,188 A | 3/1971 | Elberon et al. | |
| 3,663,932 A | 5/1972 | Mount et al. | |
| 3,680,092 A | 7/1972 | Scott | |
| 3,680,099 A | 7/1972 | Herman et al. | |
| 3,696,417 A | 10/1972 | Pedersen | |
| 3,728,721 A | 4/1973 | Lee et al. | |
| 3,750,163 A | * 7/1973 | Hecker | ............ 342/45 |

(List continued on next page.)

Primary Examiner—Bernarr E. Gregory
(74) Attorney, Agent, or Firm—Mark A. Haynes; Haynes Beffel & Wolfeld LLP

(57) ABSTRACT

A dual channel microwave sensor employs single sideband Doppler techniques in innumerable vibration, motion, and displacement applications. When combined with an active reflector, the sensor provides accurate range and material thickness measurements even in cluttered environments. The active reflector can also be used to transmit multi-channel data to the sensor. The sensor is a homodyne pulse Doppler radar with phasing-type Doppler sideband demodulation having a 4-decade baseband frequency range. Ranging is accomplished by comparing the phase of the Doppler sidebands when phase modulated by an active reflector. The active reflector employs a switch or modulator connected to an antenna or other reflector. In one mode, the active reflector is quadrature modulated to provide SSB reflections. Applications for the low-cost system include a mechanical motion/rotation sensor, a robust security alarm, a throat microphone, a stereo guitar pickup, a direction sensitive cardiac monitor, an electronic dipstick, a material thickness/dielectric sensor, a metal smoothness meter, a non-contact electronic readout, an RFID tag, silent "talking" toys, a passive-emitter data link, a beam interrupter, and a gold nugget finder.

72 Claims, 18 Drawing Sheets

U.S. PATENT DOCUMENTS

| | | | |
|---|---|---|---|
| 3,760,400 A | 9/1973 | Galvin et al. | |
| 3,781,773 A | 12/1973 | Ravas | |
| 3,796,989 A | 3/1974 | Ravas et al. | |
| 3,801,980 A | * 4/1974 | Danton et al. | 342/45 |
| 3,832,709 A | 8/1974 | Klein et al. | |
| 3,845,461 A | 10/1974 | Foreman | |
| 3,878,526 A | 4/1975 | Pedersen | |
| 3,896,436 A | 7/1975 | Johnson | |
| 3,939,474 A | 2/1976 | Coleman et al. | |
| 3,942,178 A | 3/1976 | Hackett | |
| 3,967,202 A | * 6/1976 | Batz | 342/42 |
| 3,981,011 A | * 9/1976 | Bell, III | 342/44 |
| 3,993,995 A | 11/1976 | Kaplan et al. | |
| 4,001,822 A | * 1/1977 | Sterzer | 342/44 |
| 4,195,289 A | 3/1980 | Cole | |
| RE30,288 E | 5/1980 | Hackett | |
| 4,217,582 A | 8/1980 | Endo et al. | |
| 4,225,858 A | 9/1980 | Cole et al. | |
| 4,286,260 A | * 8/1981 | Gershberg et al. | 340/554 |
| 4,314,249 A | 2/1982 | Onoe | |
| 4,347,512 A | 8/1982 | Sweeney | |
| 4,400,700 A | * 8/1983 | Rittenbach | 342/100 |
| 4,499,467 A | 2/1985 | Rittenbach | |
| 4,692,763 A | 9/1987 | Gregg, Jr. | |
| 4,760,398 A | 7/1988 | Norsworthy | |
| 4,837,578 A | 6/1989 | Gammell | |
| 5,196,826 A | * 3/1993 | Whiting | 340/554 |
| 5,237,328 A | 8/1993 | Dorey et al. | |
| 5,262,783 A | 11/1993 | Philpott et al. | |
| 5,424,737 A | 6/1995 | Lindell | |
| 5,459,468 A | 10/1995 | Hartal | |
| 5,486,830 A | 1/1996 | Axline, Jr. et al. | |
| 5,508,704 A | 4/1996 | Hann | |
| 5,521,600 A | 5/1996 | McEwan | |
| 5,573,012 A | 11/1996 | McEwan | |
| 5,682,164 A | 10/1997 | McEwan | |
| 5,729,694 A | 3/1998 | Holzrichter et al. | |
| 5,760,731 A | 6/1998 | Holmes | |
| 5,790,032 A | * 8/1998 | Schmidt | 340/573.4 |
| 5,828,333 A | 10/1998 | Richardson et al. | |
| 6,031,482 A | * 2/2000 | LeMaitre et al. | 342/22 |

* cited by examiner

SSB PULSE DOPPLER SENSOR AND ACTIVE REFLECTOR SYSTEM

BACKGROUND OF THE INVENTION

1. Field of the Invention

The present invention relates to microwave motion sensing and ranging, and more particularly to single-sideband pulse-Doppler radar including an active reflector system.

2. Description of Related Art

The Doppler effect is used to detect or measure motion in police radars, security radars and automatic door radars. Microwave vibration sensing, while similar to Doppler sensing, relies on target-induced phase modulation of a radar return, and has generally been limited to specialized industrial/scientific use. One well-publicized exception was the microwave illumination of the U.S. embassy in Moscow during the Cold War, where voices may have caused a subtle vibration in reflecting objects that could be intercepted by a vibration-sensing microwave receiver outside the embassy.

Vibration sensing radars show great potential in medical diagnostics/monitoring and speech recognition, such as cardiac monitoring (e.g., "Body Monitoring and Imaging Apparatus and Method," U.S. Pat. No. 5,573,012 to McEwan, 1996), respiration monitoring (e.g., "Respiration Monitor," U.S. Pat. No. 3,993,995 to Kaplan et al, 1976), and vocal cord sensing (e.g., "Speech Coding, Reconstruction and Recognition Using Acoustics and Electromagnetic Waves," U.S. Pat. No. 5,729,694 to Holzrichter et al, 1998).

One problem in sensing vibrations with radar is the occurrence of periodic nulls in the sensing field located every $\lambda/2$ of the RF wavelength. Thus, it is possible to fail to detect a vibrating object depending on its range from the radar. This problem is present in both single phase and quadrature phase radars. It can only be eliminated with SSB radar.

The direction of motion can be sensed by Doppler radars outfitted with quadrature detectors. A further adjunct to direction sensing is displacement sensing, where a direction-signed motion signature is integrated over a number of Doppler cycles such that a definite target displacement in one direction must occur before a detection threshold is reached (e.g., "Intrusion Detection System," U.S. Pat. No. 3,942,178 to Hackett, 1976).

Displacement sensing overcomes the hair-trigger nature of a motion sensor by requiring a substantial target movement before triggering. Displacement sensing also reduces another false alarm nuisance: trigging on RF interference. It would be very difficult for RF interference to appear like it is moving in one direction only, i.e., appear as a single sideband to a microwave carrier that is consistently within perhaps 100 Hz of a 10.5 GHz carrier-generally, neither the radar nor the interference would have such coherence or stability. Unfortunately, prior art displacement sensors do not implement interference rejection in a robust fashion, nor do they fully demodulate the Doppler sidebands into separate analog channels.

Prior art Doppler radars are lacking in key features needed to enable innumerable applications, e.g., they lack dual channel analog single sideband demodulation combined with short-pulse range-gating while implemented in a low cost architecture. Also, the prior art does not teach the use of an active reflector to measure range or material thickness from the phase relation between the range-gated Doppler sidebands.

SUMMARY OF THE INVENTION

The present invention is a system comprised of a homodyne pulse Doppler radar employing SSB demodulation which can be used either separately or in combination with an active reflector, which may also have SSB capability.

The radar transmits RF pulses, or sinewave packets or bursts, at a pulse repetition frequency PRF. As used herein, the entire burst or packet is referred to as an RF pulse, with each pulse containing one or more cycles of a sinusoidal waveform at a carrier frequency. The transmitted pulses and receive echoes are applied in quadrature to a pair of peak-hold detectors that have a large hold time spanning multiple pulse repetitions. The RF pulse width may be 30 ns wide at a 915 MHz carrier frequency with a corresponding RF bandwidth of about 30 MHz. By integrating pulse repetitions over a long time, e.g., 1-second, Doppler sidebands only 0.1 Hz removed from the RF pulse carrier can be detected.

The maximum range, or range gate, is defined by the RF pulse width, since the RF peak detectors operate only while the transmitted pulse is present, such that echoes that arrive after the transmitter RF pulse ends do not get peak detected.

The RF peak-hold detector outputs are phase shifted and algebraically summed to provide upper sideband (USB) and lower sideband (LSB) outputs. USB outputs occur with objects moving toward the radar and LSB outputs occur with objects moving away from the radar.

One feature of the invention is that the USB and LSB outputs (or channels) can be rectified and filtered to provide a directional displacement indication. These indications can be combined in a weighted fashion such that a small amount of displacement in the wrong direction, for a given LSB or USB channel, will effectively reset that channel—an especially useful feature for eliminating false alarms from loitering or RF interference.

When sensing vibrations, either the USB or LSB channel provides an output free of nulls that occur every $\lambda/2$ with non-quadrature radar or in the I or Q channel of a quadrature radar, thus removing a barrier to practicality in many applications.

Stereo operation as provided by the LSB and USB channels is non-obvious and quite unexpected in many applications such as picking up guitar string vibrations, where each stereo output has the same general frequency of the vibrating string but a different tonal quality, providing a rich, airy sound on stereo headphones. Other vibration sensing applications include (1) sensing machine vibration or motion, including blade rotation with rotational direction indication, (2) direction sensitive cardiac motion sensing, (3) respiratory motion sensing, and (4) a vocal cord microphone.

When detecting a vibrating object, the phase between signals at the LSB and USB outputs varies 360 degrees with every $\lambda/4$ of distance from the vibrating object. For an RF center frequency of 915 MHz, 360 degrees represents a distance of 8.2 cm. Since the phase signals are very clean, it is an easy matter to measure sub-millimeter variations in distance, or equivalently dielectric constant or material thickness of objects inserted between the radar antenna and the source of vibration. One application of this effect is water or oil level measurement in a tank, by measuring the transit time through the height of the liquid. The advantage to this technique is that low frequency RF can be used without the need for a large focusing antenna, since the measurement is confined to reflections from the vibrating object, which is usually the only object in the field of view that is vibrating.

Changes in radar cross section (Δ-RCS) can be detected with the present invention, such as might occur when two metallic objects scrape against each other. If two smooth tweezers are slid across each other near the radar antenna, a large noise-like response is produced by the radar indicating the degree of surface smoothness. The Δ-RCS technique can also be used in combination with mechanical or acoustic pressure to locate gold nuggets in quartz, such as might be found in a gold mine.

Electronic objects that contain switching circuits or variable conduction devices, such as audio transistors, also provide a ΔRCS signature that is readily detected by the present invention. Applications include non-contact electronic circuit readout, toys that "talk" upon illumination by a radar, and RF identification (RFID) tags.

The Δ-RCS effect can be deliberately enhanced by designing a reflector that undergoes a large Δ-RCS under electronic control. Accordingly, another aspect of the present invention is a modulated dipole or other reflector/antenna, wherein the modulation is voice, music, continuous tones or data. The modulation can be provided by a very low power CMOS circuit, such as the type used in wrist watches, and the modulating device may be a FET, which requires essentially no current to drive its gate. The micropower active reflector thus formed emits no RF energy and is thus not subject to emission regulations, and yet it can transmit information when illuminated by the radar of the present invention.

The active reflector can be quadrature modulated to provide a SSB reflection that appears in either the LSB or USB channel of the illuminating radar. Thus, multi-channel operation is possible, beyond the usual code or frequency division techniques.

An RF beam interruption system can be configured with a radar and active reflector by forming a beam path through which passing objects will create an interruption. Advantages include (1) the ability to operate through panels and environmental overcoatings such as snow, and (2) the ability to freely locate micropower active reflectors as stick-on appliques. When solar powered, the active reflectors can be permanently attached to trees, lampposts, swimming pool gates, garage door frames, etc. for simplified security, safety, or home automation control.

A system of active reflectors can be combined with the radar to form a radiolocation system wherein the range to each reflector is measured by the radar and used to calculate the location of the radar and/or one or more reflectors.

The entire radar system of the present invention can be implemented with low cost off-the-shelf components. The applications cited herein are but a few of the many novel uses for this invention.

DETAILED DESCRIPTION OF THE INVENTION

A detailed description of the present invention is provided below with reference to the figures. While illustrative component values and circuit parameters are given, other embodiments can be constructed with other component values and circuit parameters. All U.S. Patents and copending U.S. applications cited herein are herein incorporated by reference.

Figure 1:
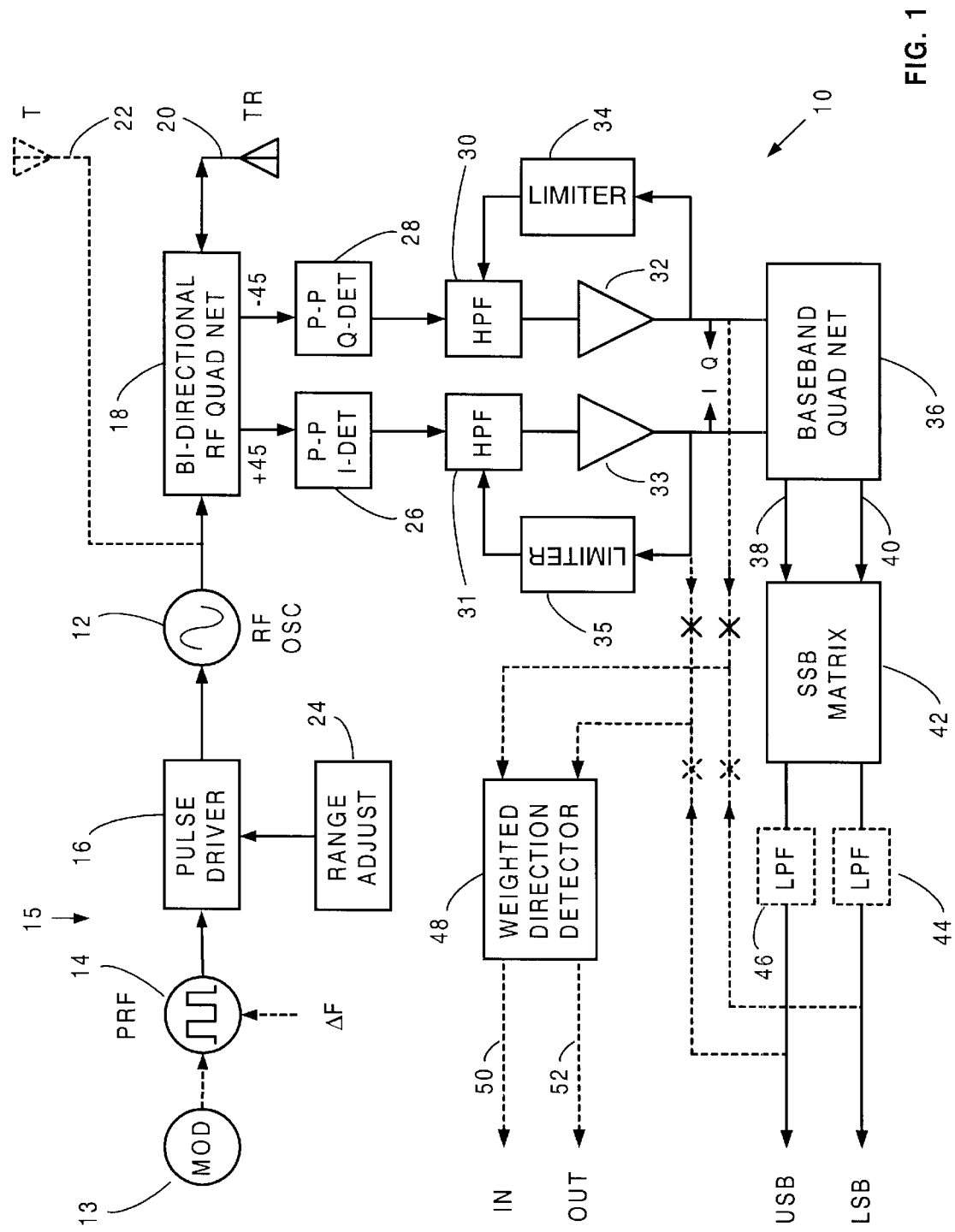
FIG. 1 is a block diagram of a single sideband pulse Doppler radar of the present invention.

FIG. 1 is a block diagram of a homodyne SSB pulse Doppler sensor 10 (or transceiver apparatus) of the present invention. An RF oscillator 12 receives clock pulses from TX clock (PRF generator) 14 via pulse driver 16 and produces RF burst pulses (transmit pulses) at the transmit/receive antenna 20 after passing through bi-directional RF quadrature network 18. Alternatively, RF oscillator 12 may drive a separate transmit antenna 22 for bistatic applications. TX Clock 14 typically produces a 2 MHz squarewave that is passed through a pulse driver 16 to form ~30 ns wide pulses. Thus, the drive pulses are clock pulses of relatively short duration. Therefore, the TX clock 14 and pulse driver 16 may together be viewed as a clock signal generator 15. Alternatively, if TX clock 14 produces sufficiently short pulses, a separate driver 16 is not required. These short pulses bias-on the RF oscillator 12, which is designed to start and stop oscillating very rapidly as a function of applied bias. The oscillations are phase coherent with the drive pulses, i.e., the phase of the RF sinusoids relative to the drive pulse remains constant each time the oscillator is started-there is no significant clock-to-RF jitter.

The TX clock 14 can be modulated in frequency or phase, or with ON-OFF gating by optional modulator 13 for various purposes known in the art, such as spreading the spectral lines generated by RF oscillator 12 to reduce interference to other spectrum users. The modulation may be coded to distinguish the radar signal from that of others. Pulse driver 16 (or more generally clock signal generator 15) can be adjusted by range adjust 24 to control the length of the transmit pulses, and thereby the range. The frequency of the PRF generator 14 can be changed by ΔF as further described below.

Bi-directional RF quadrature network (or RF quadnet) 18 couples the RF oscillator to antenna 20, and receives echo pulses picked up by an antenna 20 and provides two outputs that are in phase quadrature, e.g., at +45 and −45 degrees. These outputs are applied to peak-to-peak (P-P) detectors 26, 28 which detect and peak hold the P-P value of the RF pulses coupled from RF quadnet 18. Alternatively, these detectors can be peak, rather than P-P detectors, or they can be multipliers (i.e., mixers). The preferred mode is the P-P detector since the P-P detector presents minimal RF loading to the RF quadnet while producing maximum output. The peak hold time of the P-P detectors is quite long relative to an RF cycle—typically many microseconds to several seconds. In practice it may be fixed at about 10-microseconds and further integration of the detected signals can be effected by optional lowpass filters (LPF) 44, 46 at the output of sensor 10, as described further below.

An alternative embodiment of the RF quadnet is based on a waveguide topology rather than discrete components, wherein a transmit feed element and I, Q elements are physically arranged in the waveguide (or antenna feedhorn) to provide quadrature outputs to the P-P detectors. One implementation is given in FIG. 5 of co-pending application Ser. No. 09/073,159 "Pulsed RF Oscillator and Radar Motion Sensor," by McEwan.

The P-P detector outputs are in phase quadrature as I (in-phase) and Q (quadrature phase) signals. The I,Q signals are applied to highpass filters (HPF) 30, 31 to strip off rectified DC components and undesired low frequencies. After amplification by amplifiers 32, 33, the signals are coupled back to the HPF via limiters 34, 35. If the signals from the amplifiers exceed a certain value, limiters 34, 35 conduct and reduce the gain of the amplifier/HPF path. This feature greatly reduces long power-up transients and large near-field transients when the HPF's are set to low values such as 0.1 Hz cutoff frequency (e.g., for respiration monitoring).

Amplifiers 32, 33 are coupled to baseband quadnet 36 which provides a constant 90-degree phase shift between its two outputs 38, 40 over a wide frequency range, such as 0.1 Hz to 2 kHz. Thus, the I, Q signals from amplifiers 32, 33 are shifted 90-degrees. SSB matrix 42 adds the two outputs from the lines 38, 40 to form the LSB signal and subtracts the signals from lines 38, 40 to form the USB signal. Both the LSB and USB signals are analog Doppler signals corresponding to outbound (LSB) and inbound (USB) motion relative to the radar. Optional lowpass filters (LPF) 44, 46 may be used to further integrate the signals and limit noise or unwanted frequencies.

Weighted direction detector 48 squares or rectifies and filters the LSB and USB signals to provide unipolar representations of the net inbound or outbound motion through distance, i.e., displacement of a moving object. These representations can then be algebraically added and threshold detected to provide net inbound or outbound digital displacement indications 50, 52 that are qualified by the lack of a weighted amount of opposite displacement, as will be more fully explained with reference to FIG. 7. Alternatively, weighted direction detector 48 can be connected to the I and Q signals for the detectors 26,28.

Figure 2A:
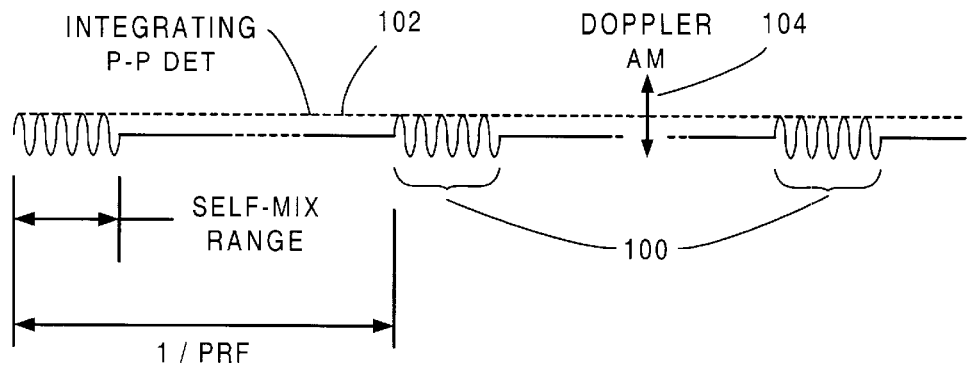
FIG. 2A is a sketch of the RF pulses and detector signal of the radar of FIG. 1.

FIG. 2A depicts the pulsed RF sinusoidal bursts or packets 100 produced by RF oscillator 12, which repeat every 1/PRF of clock 14. The width of the sinusoidal packet, which may contain anywhere from 1 to an infinite number of cycles of the sinusoidal waveform, defines the maximum sensing range of the radar, since echoes must be received before the RF packet 100 ends. This gating mechanism occurs because the P-P detector output 102 has a value related to the peak amplitude of the transmit packet 100. Echo signals are always of much lower amplitude and can only affect the P-P amplitude if they are received in time to add with the transmit packet. When the receive packets, i.e., echoes add to the transmit packet, even by partial overlap, they amplitude modulate (AM) the P-P detector output as an AM Doppler variation 104. The beating of a Doppler return with the transmit packet is thereby detected by the P-P detector. This arrangement is effectively a sampled data system with a long-hold peak detector connecting the samples.

Figure 2B:
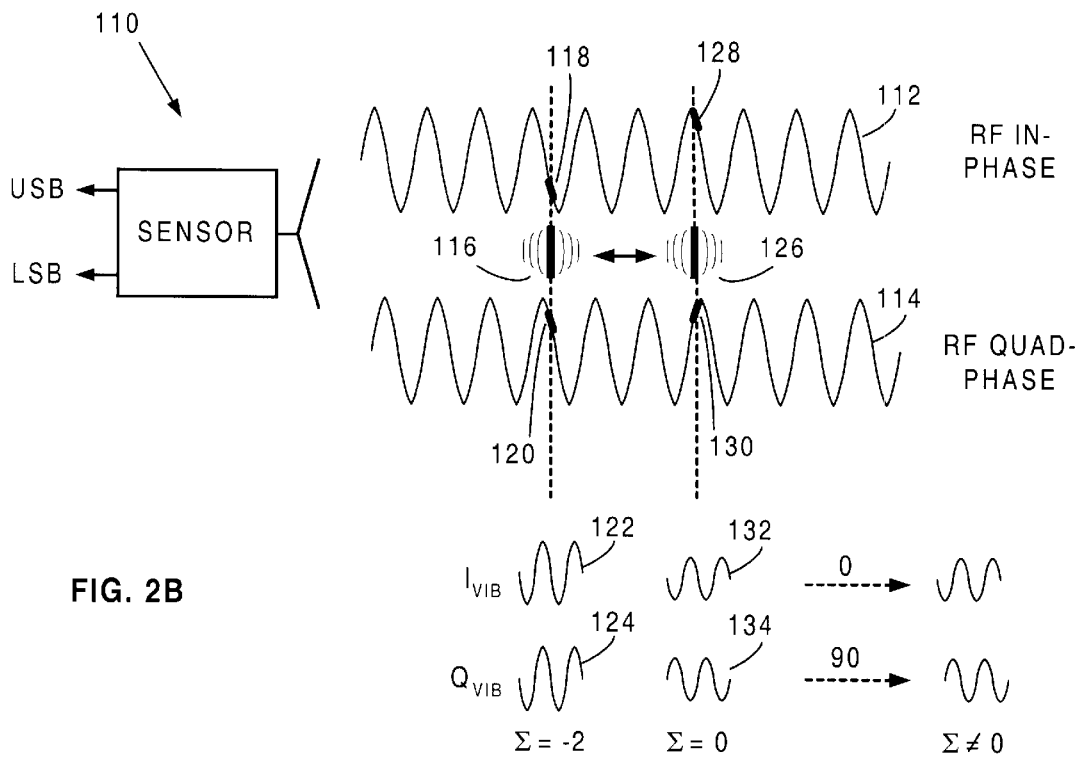
FIG. 2B is a sketch of the vibration-induced phase modulation in a vibration sensing mode of the radar of FIG. 1.

FIG. 2B depicts the radar and antenna combination, or sensor 110, as shown in detail in FIG. 1. Quadrature standing waves 112, 114 are effectively projected from the sensor. In other words, if a large target is moved toward sensor 110, its I and Q signals will reproduce the waves 112, 114 as though they are fixed in space. When a vibrating object 116 is located at points 118, 120, $I_{VIB}$ and $Q_{VIB}$ signals 122, 124 are produced. Also, it can be understood that an object vibrating at a peak or valley of wave 112 or 114 will not produce a vibration signal since the slope of the standing wave is zero.

Note that the vibration is substantially less than one cycle, as indicated by the intensified lines at points 118, 120. However, the $I_{VIB}$ and $Q_{VIB}$ signals are approximately sinusoidal and in phase for a sinusoidal vibration. If a vibrating object 126 is located at points 128, 130, out of phase $I_{VIB}$ and $QV_{IB}$ signals 132, 134 are produced. If $I_{VIB}$ and $Q_{VIB}$ are added, there will be either a doubling in amplitude or a null, depending on the location of objects 116, 126. Thus, simple addition of I, Q will not result in reliable or consistent vibration sensing.

If I, Q are quadrature phase shifted and then added they will never add to zero since they are always orthogonal. In fact, they become constant amplitude signals, free of the usual nulls, and with a relative phase that varies 360° with every λ/4 change in range to sensor 110. The phase shifted and algebraically added I, Q signals represent the USB and LSB outputs of sensor 110.

Figure 3:
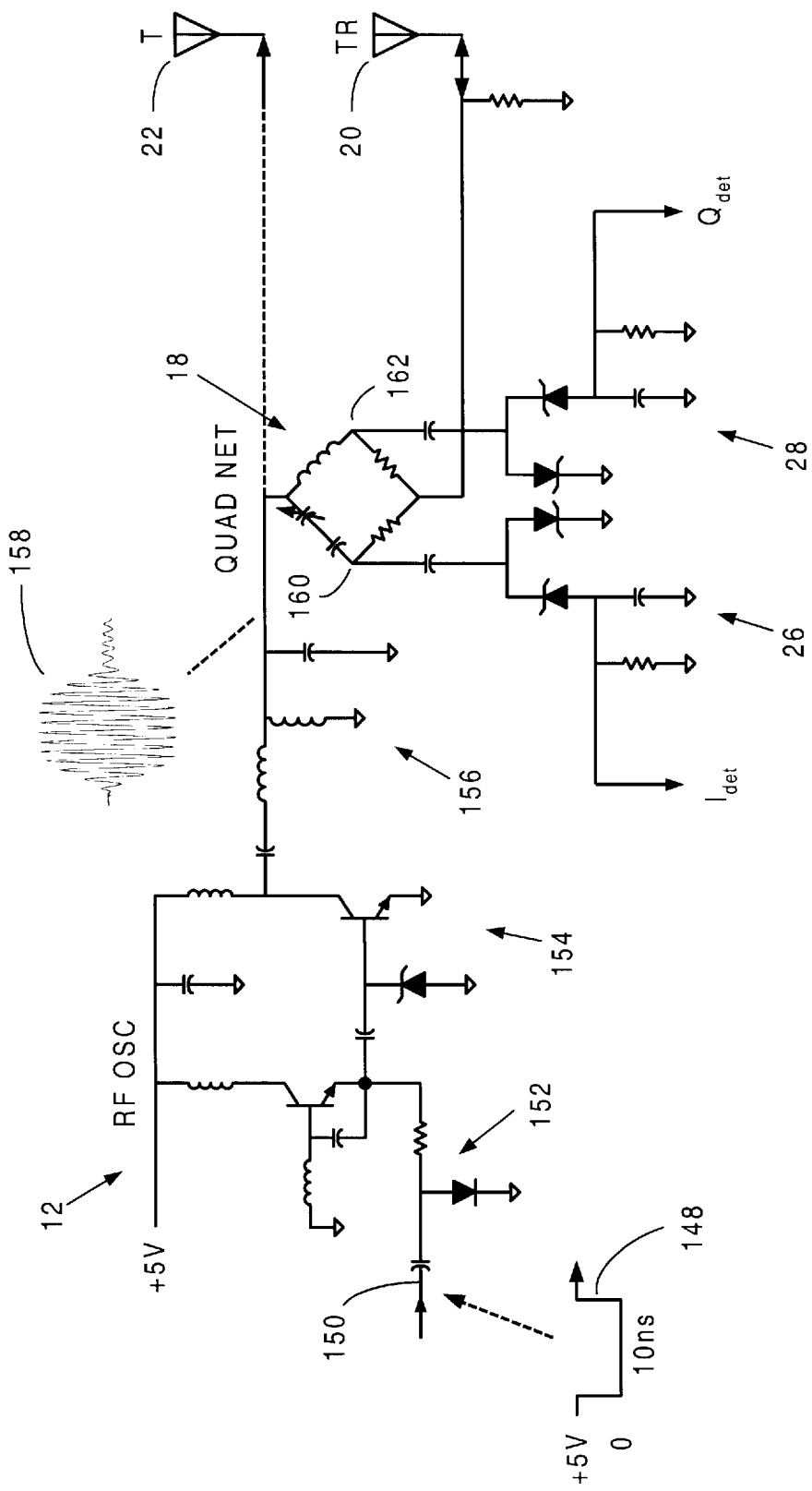
FIG. 3 is a schematic diagram of the RF oscillator, bi-directional quad net and peak-to-peak detectors of FIG. 1.

FIG. 3 is a detailed schematic of the RF oscillator 12, RF quadnet 18, and P-P detectors 26, 28 of FIG. 1. A +5 to 0 volt drive pulse 148 is coupled to RF oscillator 12 via line 150 and capacitor-diode AC level shift network 152 to provide an approximate 0 to −5-volt bias pulse to Colpitts RF oscillator 12. The RF oscillator output is coupled to class B biased buffer/amplifier 154, which draws no current except when driven by the RF oscillator. The buffer/amplifier is coupled via harmonic-blocking filter 156 to form an RF pulse 158 (actual 915 MHz hardware data) to the RF quadnet 18. Optionally, transmit antenna 22 may be coupled to the quadnet to provide a separate transmission location. This mode of transmission is generally less preferred, but has some application in bistatic radar configurations. The preferred antenna configuration is with the RF quadnet coupled to a single transmit/receive antenna 20.

Quadrature network 18 is a bridge circuit having two branches, one comprised of an inductor in series with a resistor to provide a lagging phase shift, and the other arm comprised of a capacitor in series with a resistor to provide a leading phase shift. Over a band of about +/−10% of the RF carrier frequency, the phase difference appearing at nodes 160, 162 remains within 2° of exact quadrature, i.e., 90°. Since the carrier frequency is maintained within 1% of its design value, an accurate 90° phase shift is maintained.

RF pulse 158 passes through the RF quadnet 18 in transit to antenna 20, and undergoes a +22.5-degree phase shift at node 160 and a −22.5-degree phase shift at node 162. Received echo pulses undergo similar phase shifts to produce a net Doppler beat frequency phase shift of 90 degrees between nodes 160,162. Thus, part of the 90-degree phase shift is incurred during transmission, and part during reception, making the network a bidirectional phase shift network. The relative amount of phase shift may not be equal in each direction; it is simply necessary that the total bidirectional phase shift is 90 degrees. One advantage to this type of network over a transmission line is that it acts at a single point and thus is less sensitive to voltage standing wave ratio (VSWR) effects that arise between harmonic filter 156 and antenna 20.

Peak-to-peak detector 26 (28) is comprised of two diodes, one that conducts on the positive half of the RF cycle appearing at node 160 (162) and the other conducting during the negative half cycle. The voltage appearing at $I_{det}$ ($Q_{det}$) equals the peak-to-peak RF voltage minus two diode drops.

Figure 5A:
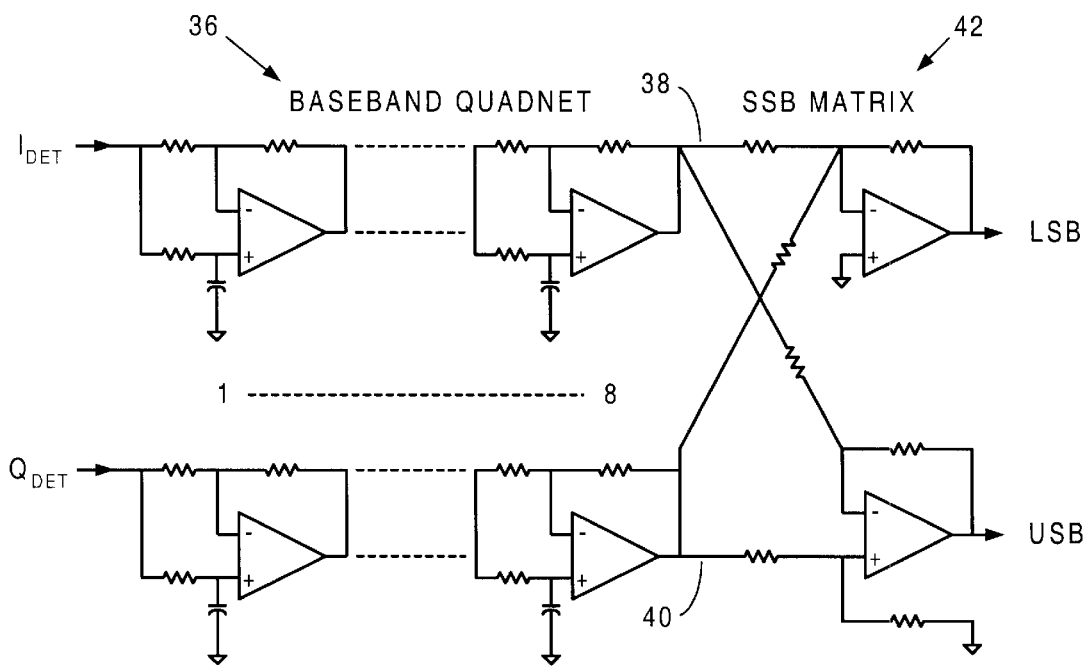
FIG. 5A is a schematic of the baseband quadnet and SSB matrix of FIG. 1.

P-P detectors 26, 28 are coupled to nodes 160,162 and provide $I_{DET}$ and $Q_{DET}$ detection voltages to the baseband quadnet of FIG. 5A. The resistors and capacitors associated with these detectors are scaled to provide peak-hold times that span more than one RF pulse repetition, and thus perform coherent integration of the individual RF pulses.

Figure 4:
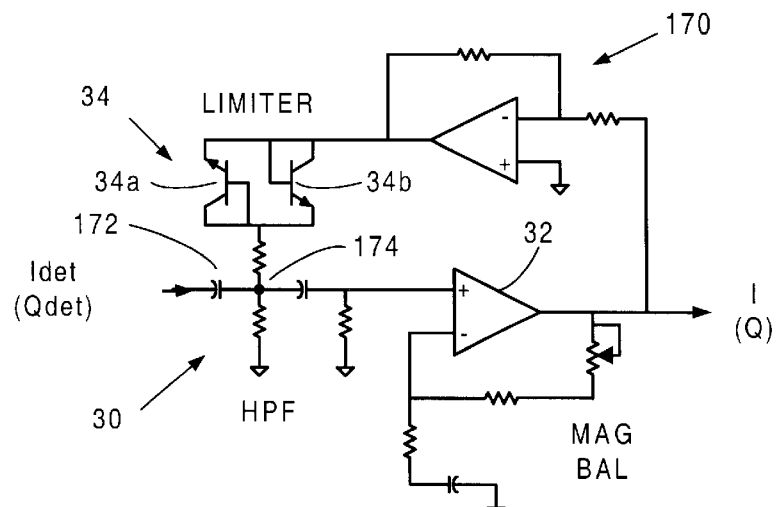
FIG. 4 is a schematic diagram of the highpass filter, amplifier and limiter of FIG. 1.

FIG. 4 details the HPF 30, amplifier 32, and limiter 34 as block diagrammed in FIG. 1. HPF 30 is an RC network which couples the $I_{DET}$ signal to amplifier 32, whose output is coupled to limiter scaling amplifier 170. The operation of the other channel ($Q_{DET}$) is similar. The gain of the scaling amplifier sets the voltage required at the output of amplifier 32 to drive limiter diodes 34a, b of limiter 34 into condition to shunt away excess input signal to HPF 30. An advantage to limiter 34 is that the HPF input capacitor 172 can be rapidly brought into a near zero voltage condition at node 174. Input capacitor 172 is often very large and would take an enormous time to charge were it not for diodes 34a, b. Under normal operation, the Doppler voltages at node 174 are too small to cause diodes 34a, b to conduct. Diodes 34a, b are formed of back-to-back transistor diode junctions rather than discrete diodes due to the ready availability of very low leakage junctions in low cost transistors, e.g., 2N3904, as opposed to the scant availability of low cost, low leakage discrete diodes.

FIG. 5A illustrates the baseband quadnet 36 and SSB matrix 42 as block diagrammed in FIG. 1. The baseband quadnet is comprised of a dual ladder of active allpass networks, which are well-known in the art. The SSB matrix adds and inverts the two quadnet output channels 38, 40 to form the LSB output, and subtracts and inverts the two quadnet channels to form the USB output. For best performance, all resistors and capacitors in FIG. 5A must be of a precision value (e.g., 1% accuracy or better). Some applications of the present invention operate at a single baseband frequency, so only one stage of the allpass quadnet is needed, rather than the 8 stages shown in FIG. 5A, which yields greater than 4 decades of frequency span. In general, N stages can be used, where N is an integer.

Figure 5B:
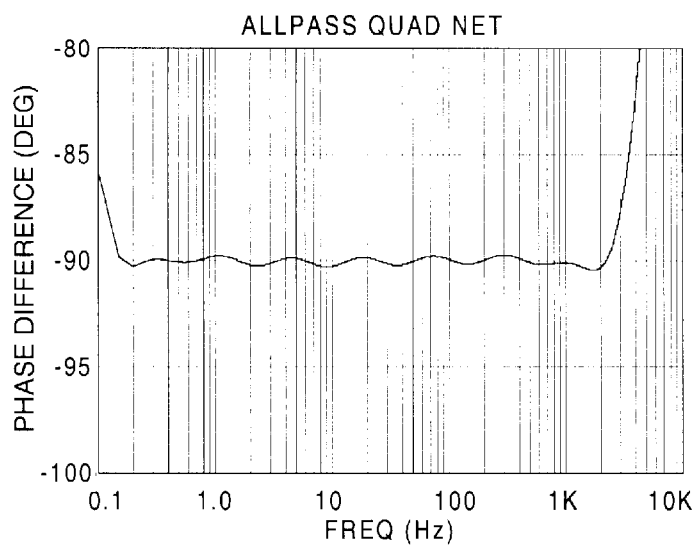
FIG. 5B is a mathematical plot of the phase characteristics of the baseband quadnet of FIG. 1.

FIG. 5B plots the phase difference at the outputs 38, 40 of quadnet 36 across a broad frequency range, assuming the two inputs to the quadnet have zero phase difference. Most allpass phase splitters of this type operate over an octave or perhaps a decade of frequency range. FIG. 5B shows over four decades of range with only an 8-stage network. This mathematical simulation was verified in hardware.

Figure 5C:
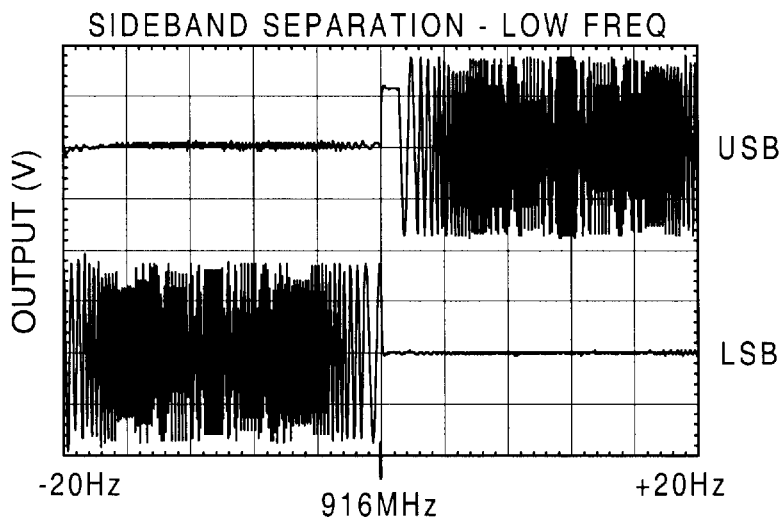
FIG. 5C is hardware data showing the sideband separation within +/−20 Hz of the short-pulse RF carrier for the system of FIG. 1.
Figure 5D:
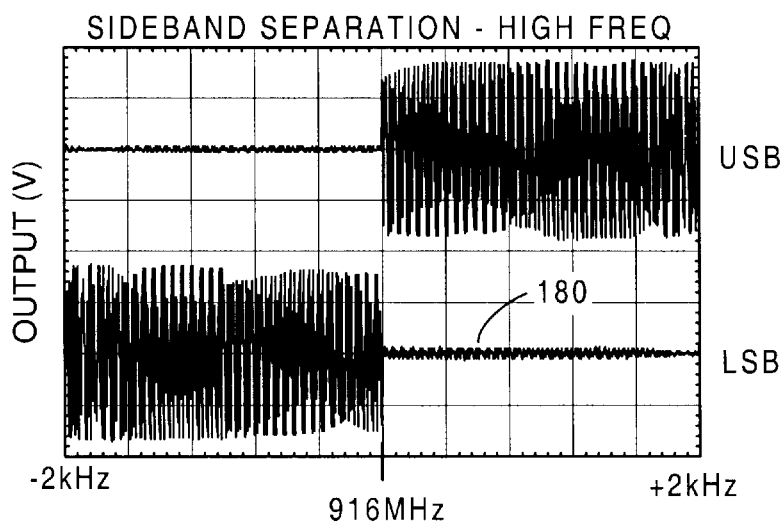
FIG. 5D is hardware data showing the sideband separation within +/−2 kHz of the short-pulse RF carrier for the system of FIG. 1.

FIGS. 5C, D plot the USB and LSB channel separation versus frequency, for a +/−20 Hz span and +/−2 KHz span about an RF center frequency of 916 MHz. The USB, LSB crossovers in the middle of the plots are surprising sharp. These plots were made by synchronizing PRF clock 14 to an HP8660C frequency synthesizer set to sweep +/−20 Hz in FIG. 5C and +/−2 KHz in FIG. 5D about 916 MHz, in 1 Hz steps. Since RF oscillator 12 is phase locked to the PRF clock 14, the RF oscillator has precise spectral lines every multiple of the PRF. The PRF was set to 2 MHz and the RF pulse width was 30 ns. Some of the coarseness seen in FIGS. 5C and 5D is due to the discrete steps, as well as aliasing artifacts in the plots. The baseband quadnet was fabricated with 5% components, which limited the separation levels, as seen by the slight signal at 180.

Figure 6A:
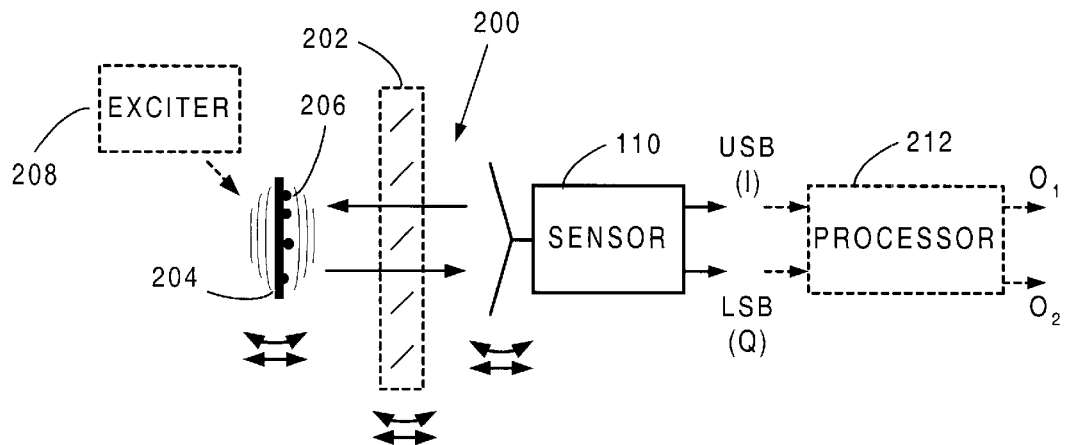
FIG. 6A shows a general arrangement of a system for detecting vibrating or moving objects.

FIG. 6A depicts sensor 110, which is based on FIG. 1, in a general vibration sensing setup. RF pulses 200 are transmitted to and reflected from an object 204. In some arrangements a non-opaque material 202 is in the propagation path. Any or all of the sensor 110, material 202, or reflecting objects 204 may be spatially translated or rotated as indicated by the arrows in FIG. 6A, generally 210, for imaging or application specific purposes. In some cases object 204 is simply translated or rotated through large distances, e.g., a moving person, car, or fan blade. In other cases, object 204 may vibrate, possibly as the result of exciter 208, which may be a mechanical, acoustic (e.g., a microphone application), magnetic (e.g., a loudspeaker application), optical, or electromagnetic stimulus. Processor 212 can perform various operations on the USB, LSB Doppler sidebands, such as squaring, integrating and summing to provide a signed magnitude signal. Naturally, many other processing functions are possible, including taking the FFT of the Doppler sideband signatures.

One application for the setup of FIG. 6A relies on the detection of a shift in vibration characteristics due to overcoatings 206 on vibratory object 204. The overcoating may be plating, polymer coatings, contaminants, etc., the thickness or other characteristics of which may be assessed on a non-contact basis with sensor 110.

Figure 6B:
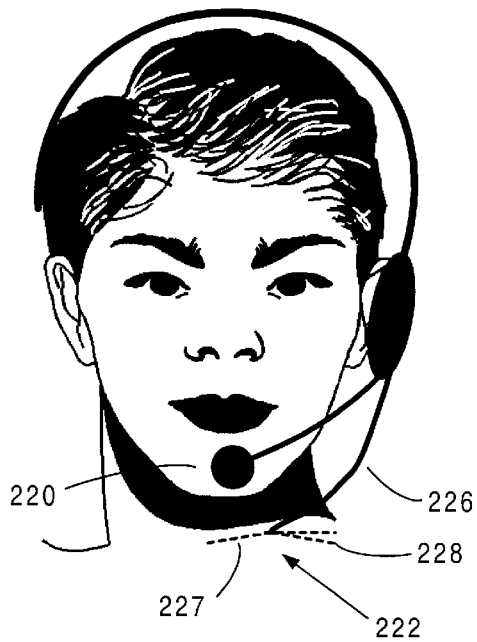
FIG. 6B illustrates a radar throat microphone arrangement of the system of FIG. 6A.
Figure 6C:
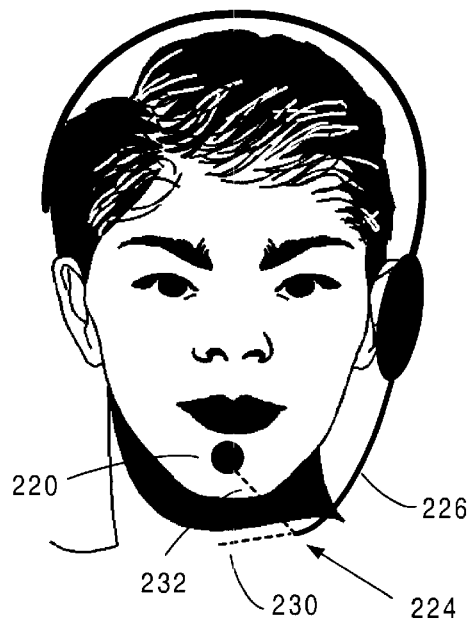
FIG. 6C illustrates an alternative radar throat microphone arrangement of FIG. 6A.

FIGS. 6B, C illustrate a vocal cord microphone application of FIG. 6A, wherein a headset combines a conventional boom microphone 220 with an antenna 222 or 224 of the sensor of FIG. 1. Boom 226 houses a cable that connects the antenna 222 or 224 to bidirectional quadnet 18. Antenna 222 is a dipole comprised of a radiator 227 and ground element 228, which are generally connected to the shield of the interconnect cable. Antenna 224 is a dipole comprised of radiator element 230 and ground element 232, which also serves as a mechanical support for acoustic microphone 220. Obviously, other variations on the dipole antenna are possible. Using antenna 222, the response to the sound "hmmm" is plotted in FIG. 6F for the I and USB signals of FIG. 1.

Figure 6D:
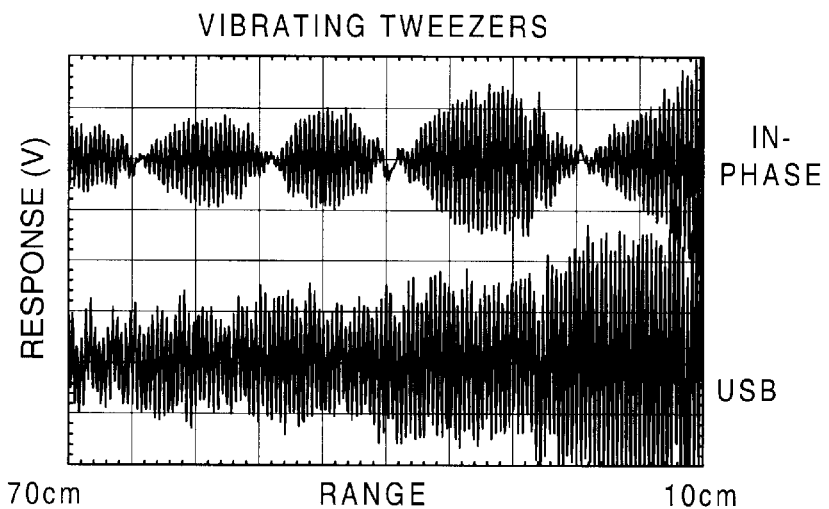
FIG. 6D plots the response to a pair of vibrating tweezers versus range for the setup of FIG. 6A.

FIG. 6D plots the I and USB responses to vibrating metal tweezers versus range. The problematic response nulls discussed with respect to FIG. 2B are clearly seen in the I channel but not in the USB channel, thereby demonstrating the value of SSB demodulation.

Figure 6E:
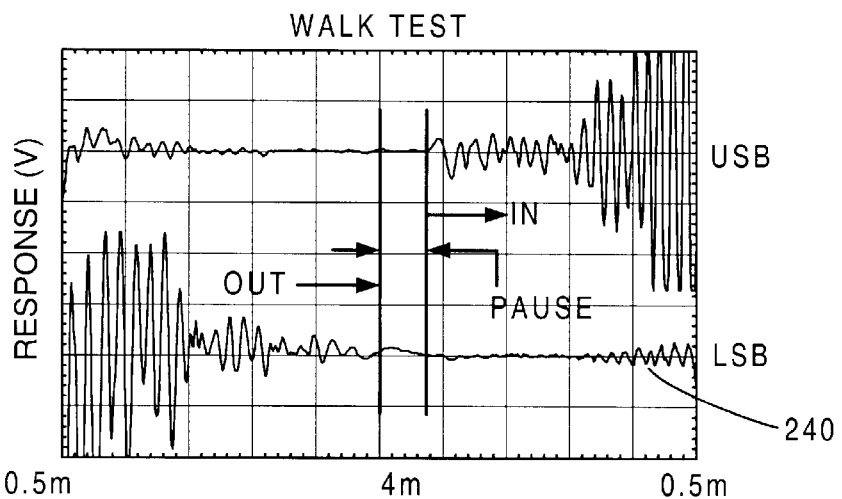
FIG. 6E plots the response to a person walking outbound and inbound for the setup of FIG. 6A.
Figure 6F:
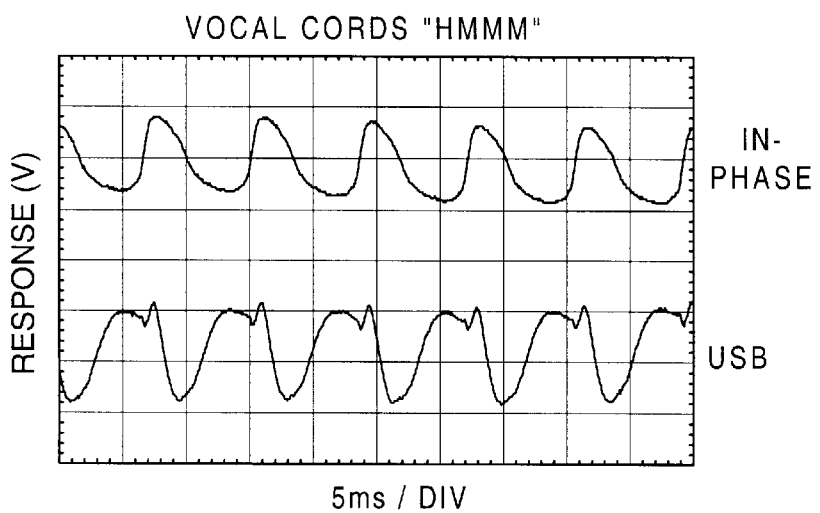
FIG. 6F plots the response to vibrating human vocal cords for the sound "hmmm" for the setup of FIG. 6A.

FIG. 6E plots the response of a person walking away or OUT from the sensor of FIG. 6A, pausing, and then walking IN to illustrate the separation of the Doppler sidebands. A slight channel bleed-through 240 results from non-precision components in the baseband quadnet 36.

Figure 6G:
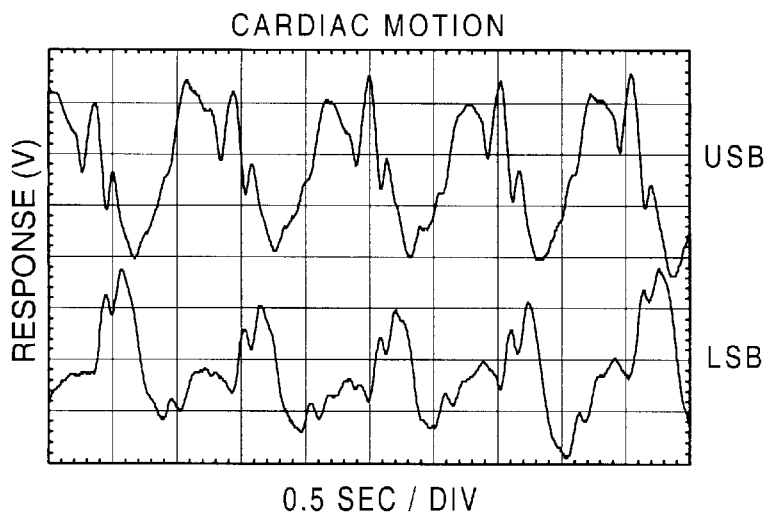
FIG. 6G plots the response to human cardiac motion for the setup of FIG. 6A.

FIG. 6G reveals simultaneous inbound and outbound components of cardiac activity using a simple dipole antenna pressed to the chest, using a system depicted schematically in FIG. 6A. This SSB signature is more consistent versus antenna location on the chest than prior art radars due to the absense of sensitivity nulls. The USB and LSB waveforms may be further processed into a signed magnitude indication for a more general and consistent signature. When combined with an EKG waveform, cardiac stimulus-response data becomes available with promising diagnostic/monitoring applications, including non-contact monitoring during surgery or long-term care.

Figure 6H:
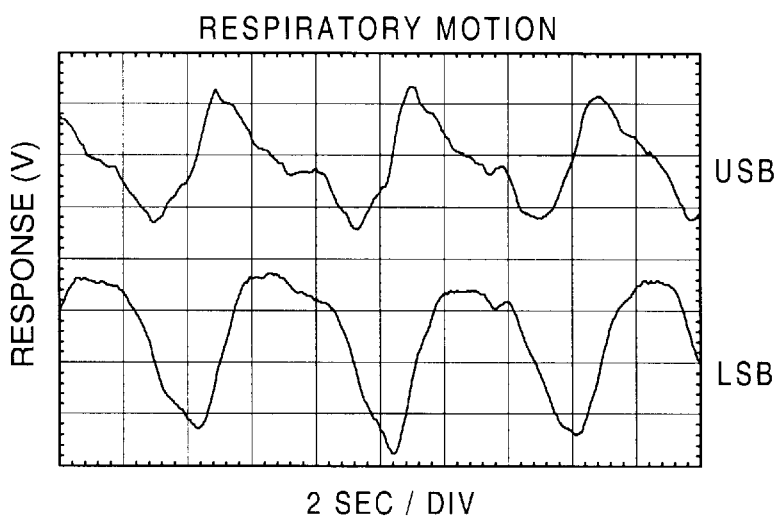
FIG. 6H plots the response to human respiratory motion for the setup of FIG. 6A.

FIG. 6H plots respiratory motion for the setup of FIG. 6A at about 1-meter range, indicating the potential for non-contact patient monitoring or SIDS detection.

Figure 6I:
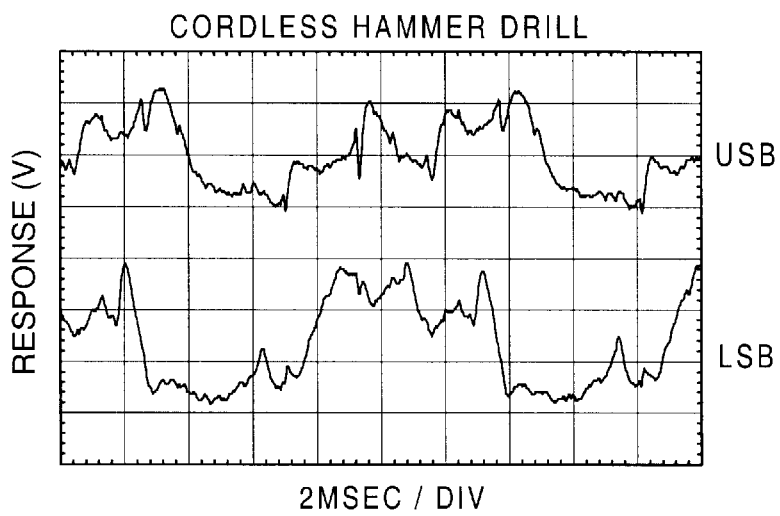
FIG. 6I plots the response to the motion of a hammer drill for the setup of FIG. 6A.

FIG. 6I shows two distinct signatures from a cordless hammer drill at about ½ meter range, indicating the potential for the setup of FIG. 6A to monitor or diagnose machine motion.

Figure 6J:
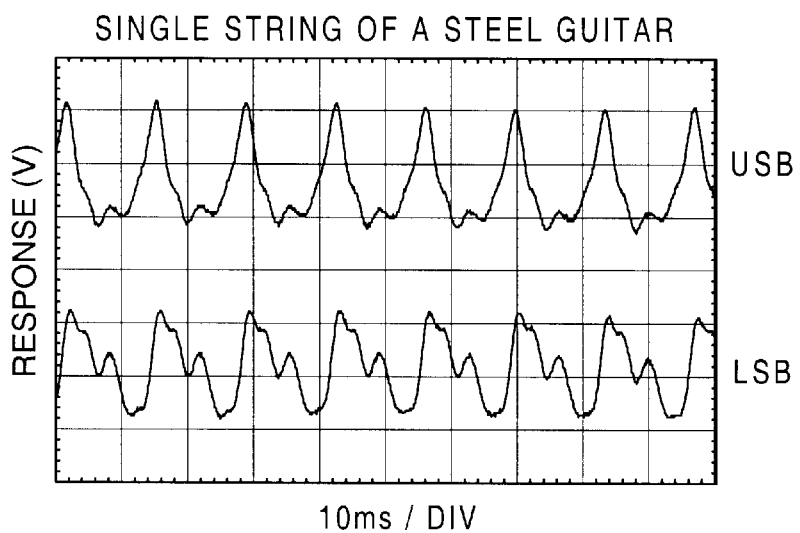
FIG. 6J plots the stereo response to a single plucked guitar string for the setup of FIG. 6A.

FIG. 6J debuts a stereo guitar pickup. With a 915 MHz dipole positioned in parallel to the guitar strings and about 10 cm away, a large variety of distinctly different waveforms can be observed in the USB and LSB "stereo" channels even for a single plucking of the string. Listening tests with stereo headphones provide an interpretation of FIG. 6J: both channels are of the same amplitude and have the same frequency, but the tonal quality is very different in the right and left headphones. Indian sitar players claim all of music is contained in a single note—it's all in the harmonics, as can be heard in the open and airy dimensionality of this stereo SSB Doppler radar pickup.

Figure 6K:
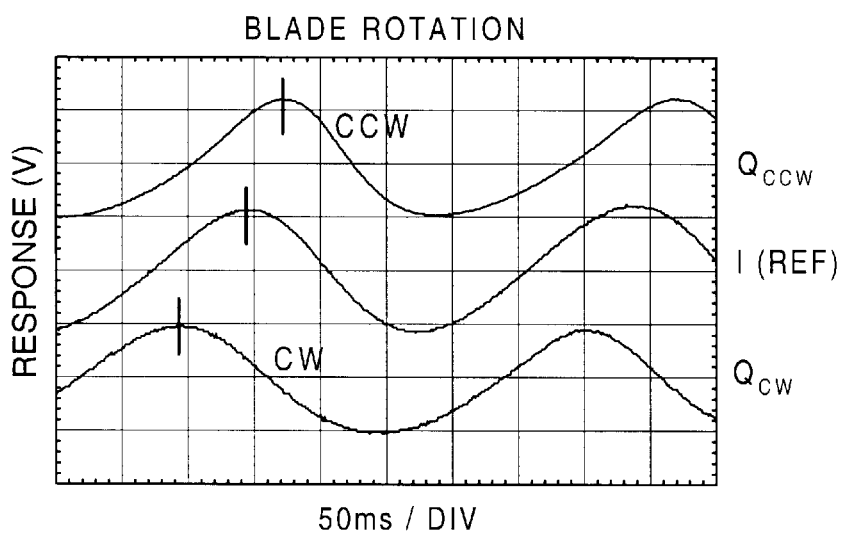
FIG. 6K plots the response to a CW and CCW rotating blade for the setup of FIG. 6A.

FIG. 6K was produced by rotating a metal blade 5 cm away from a 915 MHz dipole for the setup of FIG. 6A, using the I channel as a sync pickoff for the scope. As can be seen, the phase of the Q channel depends on the direction of rotation. Thus, a single dipole can sense the direction of blade rotation.

Figure 7:
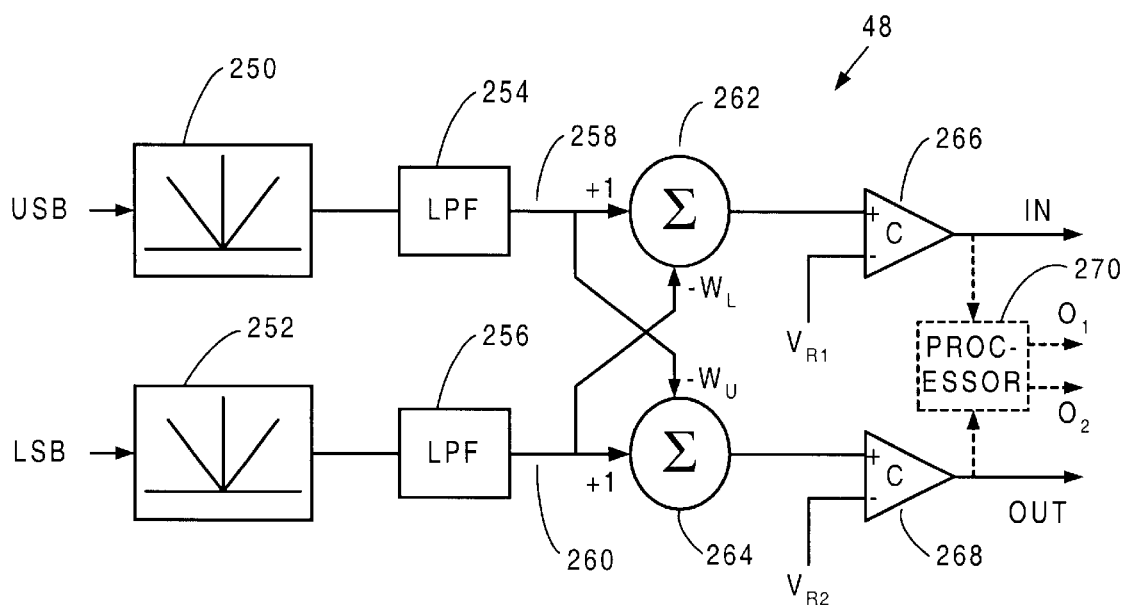
FIG. 7 is a diagram of a weighted object displacement sensor for the general setup of FIG. 6A.

FIG. 7 is a block diagram of a weighted direction detector 48 of FIG. 1, which is generally used in the setup of FIG. 6A for moving objects. The USB, LSB outputs from the sensor of FIG. 1 are applied to absolute value circuits 250, 252, or alternatively squaring circuits, to provide a unipolar fluctuating signal that is filtered in LPFs 254, 256 to produce an integrated motion-through-distance, or displacement, signature on line 258 for inbound movement, and on line 260 for outbound movement. Summation element 262 subtracts outbound signatures from inbound signatures with a weight $W_L > 1$ (typically $W_L \sim 10$) assigned to the outbound channel (LSB), and similarly for summation element 264, which subtracts inbound signatures from outbound signatures with a weight $W_U > 1$ assigned to the inbound channel. Thus summation element 262 outputs a positive displacement signature from line 258 for inbound displacement, unless there is simultaneously an outbound displacement signature (normally an impossibility for a moving car or person, etc.). If there is a concurrent outbound displacement, the output of summation element 262 will swing sharply negative due to the application of the signature on line 260 to summation input $-W_L$. Accordingly, arbitrarily small amounts of a concurrent opposite displacement will prevent positive outputs from occurring at the summation outputs. Bona fide displacements will cause a positive summation that can exceed thresholds $V_{R1}$, $V_{R2}$ of threshold comparators 266, 268 and produce a digital IN or OUT indication (which may be further processed by processor 270 to control a process, etc).

Obviously, RF interference will produce roughly equal signatures on lines 258, 260. By virtue of weights $W_L$, $W_U$, the probability of a positive summation and potential false triggering approaches zero as $W_L$, $W_U$ are increased in magnitude. Consequently, a sensor based on this scheme will become increasingly blinded with increasing RF interference, but may never trigger a false alarm due to RF interference.

Figure 8A:
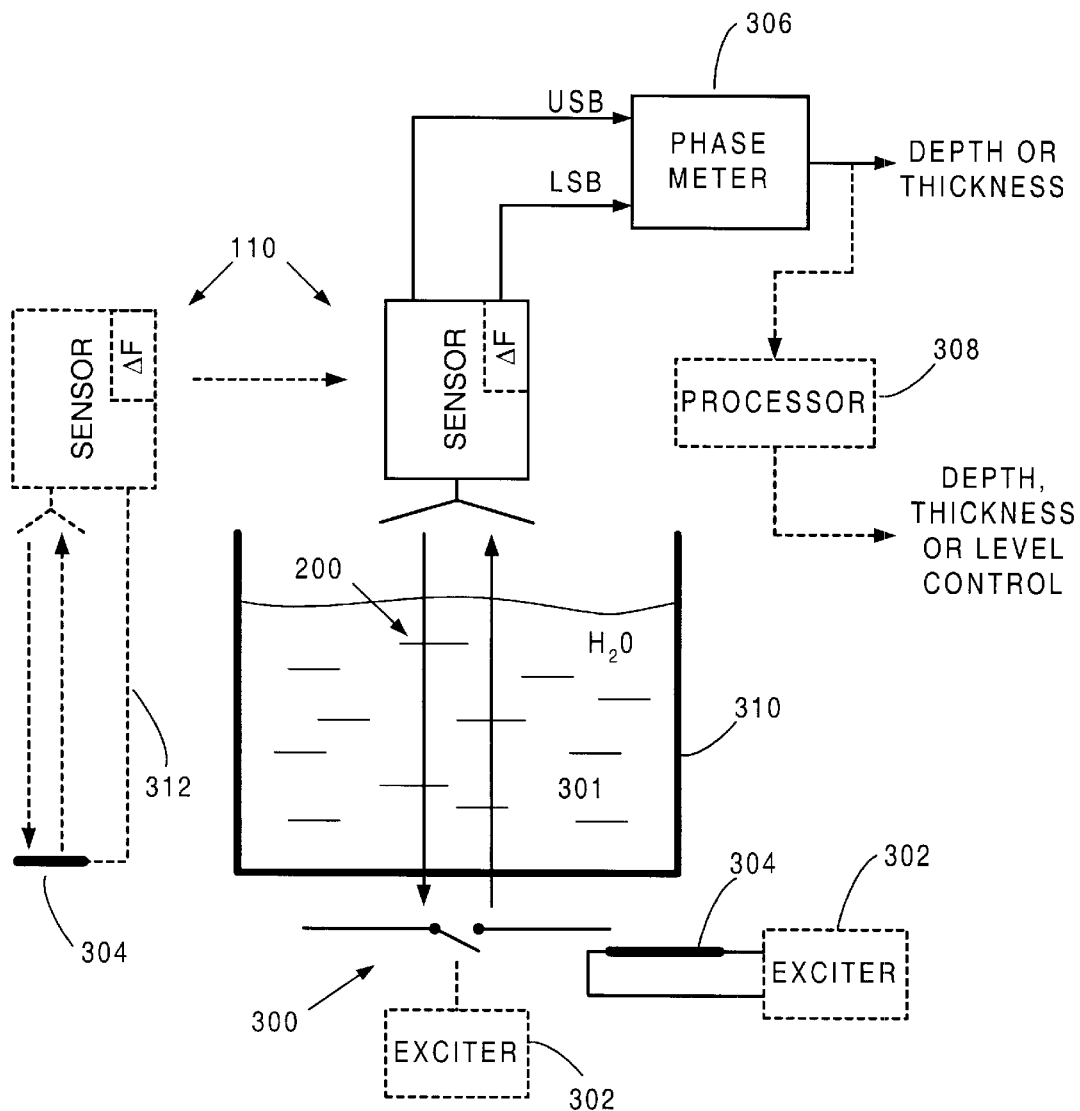
FIG. 8A is a diagram of a level or thickness gage using an active reflector with the system of FIG. 6A.

FIG. 8A illustrates the general setup for measuring a material thickness, and in particular, the height of a liquid 301 in a tank 310. Sensor 110 transmits RF pulses 200 through a material or liquid 301 which then reflect off a vibrating or active reflector 300. Active reflectors will be discussed in further detail with reference to FIG. 10A. Reflector 300 is an actively modulated antenna such as a dipole connected to a switch that is rapidly opened and closed under control of exciter 302. Alternatively, another active reflector 304 may be a florescent lamp, a mechanically vibrating device, or any reflector capable of phase modulating the transmitted RF pulses 200.

The USB, LSB outputs from sensor 110 have a phase relationship that varies with distance to the active reflector 300, or alternatively with the combined height and dielectric constant of the intervening material. The USB, LSB phase is a linear function of apparent reflector range and is measured by phasemeter 306 to provide a depth or thickness indication, which may be processed by processor 308 to operate a level controller or other responsive apparatus.

Active reflector 300, 304 is shown outside the tank 310 for convenience, but may be located inside the tank, e.g., mounted on a rod 312 attached to the sensor 110 to form a unitized dipstick.

The center frequency of RF oscillator 12 can be changed by a small amount $\Delta F$, by changing the PRF of clock 14 by $\Delta F$ as shown in FIG. 1, to offset the USB, LSB phase readings and produce a vernier effect with a range ambiguity related to $1/\Delta F$, which is much longer than the USB, LSB phase ambiguity which repeats every $\lambda/4$ in range. Accordingly, by comparing the USB, LSB phase at two frequencies separated by $\Delta F$, coarse range measurements can be made across a range span related to $1/\Delta F$, while fine range measurements can be made by looking at the USB, LSB phase at just one frequency. The phase vernier effect based on $\Delta F$ is well-known in other applications.

Figure 8B:
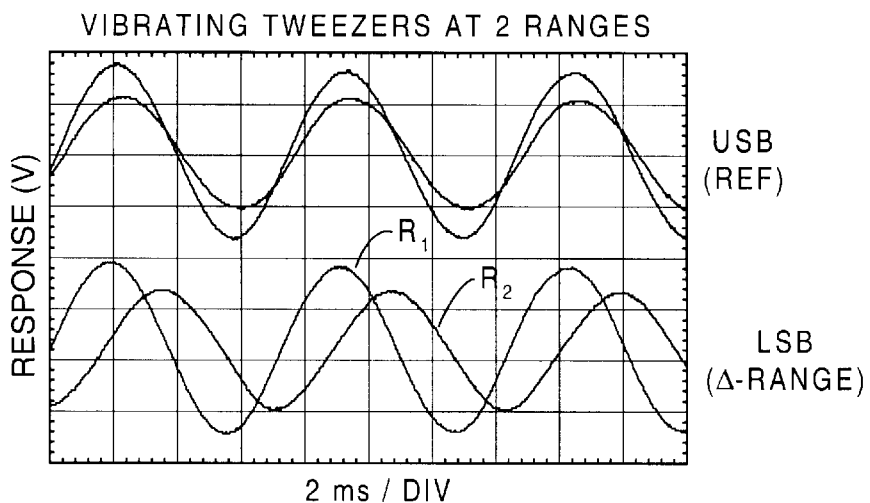
FIG. 8B illustrates the sideband phase relation versus range for the setup of FIG. 8A FIG. 8C indicates the shift in sideband phase with 3 cm of paper inserted in the target path.

FIG. 8B plots the USB response, which is used to trigger an oscilloscope as a timing reference, and the LSB response which is seen to vary in phase at ranges $R_1$, $R_2$, representing $R_2-R_2 \sim 2$ cm change in range. A pair of 250 Hz vibrating tweezers was used as the active reflector. The phase shift versus range cycles through 360 degrees for every ¼ wavelength of RF. This phase shift is independent of the modulation or vibration frequency of the active reflector.

Figure 8C:
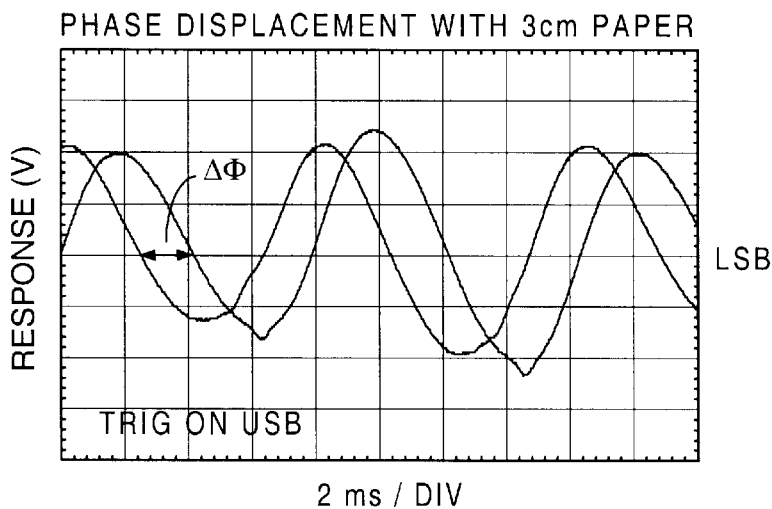
FIG. 8D indicates the shift in sideband phase with a 1 cm increase in water within the target path.

FIG. 8C plots the change in phase when 3 cm of paper is inserted between the sensor 110 and the reflector 304, indicating the invention's use as a material thickness gage, or a dielectric constant sensor—as may be useful with crop harvesters or dryers.

Figure 8D:
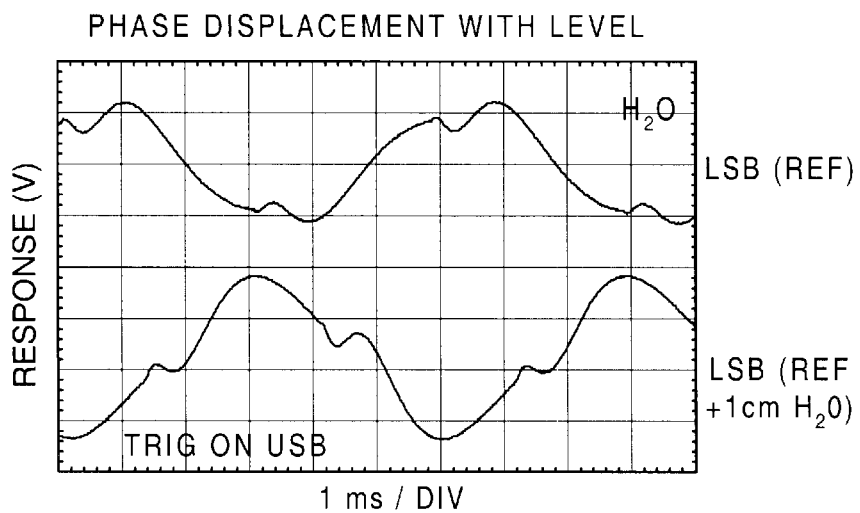

FIG. 8D plots the change in phase when 1 cm of water is inserted between the sensor 110 and the reflector 304 (i.e., 1 cm of water added to a tank containing 10 cm of water (REF waveform)).

Figure 9A:
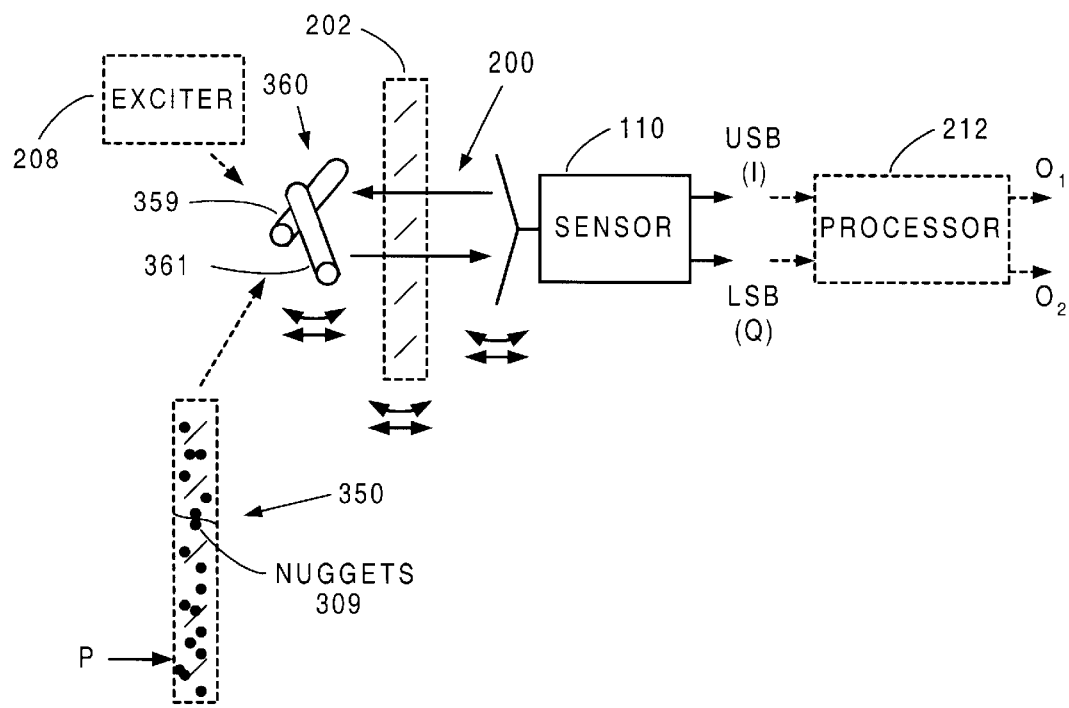
FIG. 9A shows a general arrangement for detecting target Δ-RCS.

FIG. 9A depicts an unusual active reflector modality based on reflector $\Delta$-RCS or change in radar cross section, usually as an incidental or unanticipated effect. This effect can be ascribed to the fact that two objects have a different RCS when separated than when in electrical contact. For example, two quarter wave metal strips reflect differently when isolated than when in contact to form a single half wavelength reflector. If the two strips intermittently contact, they will produce a readily detectable noise-like signature.

Figure 9B:
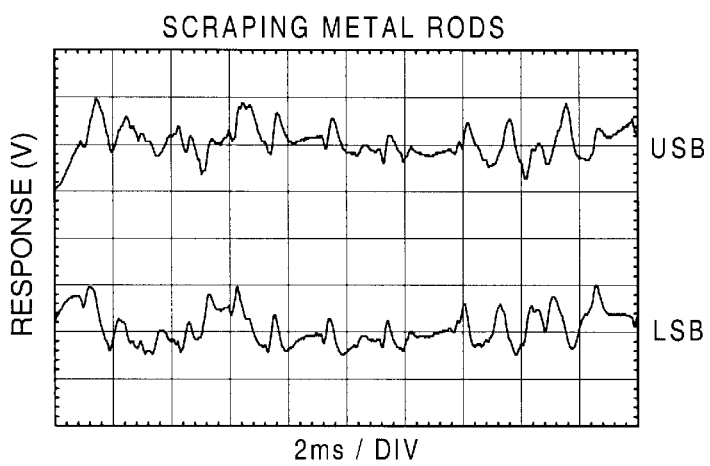
FIG. 9B plots the response to scraping smooth metal tweezers for the setup of FIG. 9A.

FIG. 9B illustrates the $\Delta$-RCS effect when two smooth metal rods (actually very smooth stainless steel tweezers) are gently slid or scraped across each other.

The system of FIG. 9A is similar to that of FIG. 6A. Object 360 comprises two rods or other objects 359, 361. In some arrangements a non-opaque material 202 is in the propagation path. Any or all of the sensor 110, material 202, or reflecting objects 359, 361 may be spatially translated or rotated as indicated by the arrows in FIG. 6A, for imaging or application specific purposes. Object 356 may vibrate, possibly as the result of exciter 208, which may be a mechanical, acoustic, magnetic, optical, or electromagnetic stimulus. Processor 212 can perform various operations on the USB, LSB Doppler sidebands, such as squaring, integrating and summing to provide a signed magnitude signal. Naturally, many other processing functions are possible, including taking the FFT of the Doppler sideband signatures.

Figure 9C:
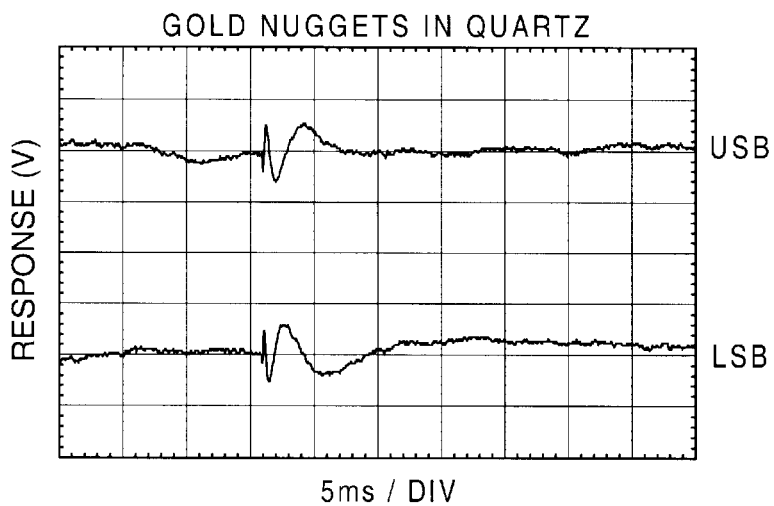
FIG. 9C plots the response to gold nuggets embedded in quartz for the setup of FIG. 9A.

FIG. 9C provides a glimpse of the potential for the $\Delta$-RCS detection method to find gold. Often, gold nuggets are suspended in quartz or other rocky materials that have fissures. When the fissures are flexed or moved slightly by a pressure P applied to the general area, nuggets lying on the fissure will scrape and produce a $\Delta$-RCS signature as seen in FIG. 9C. Nuggets embedded in quartz from a California gold mine were detectable at 2-meters range using a makeshift radar of the present invention. Pressure P may be propagated to the nuggets by a blow to a mine wall by a sledgehammer or small explosive charge, and sensor 110 may be outfitted with headphones or a recording means to detect $\Delta$-RCS signatures, which will mainly occur from scraping metals embedded in the rock. The detection of gold nuggets 309 in a material 350 is illustrated in FIG. 9A by replacing object 360 with material 350 and applying pressure P to material 350.

Figure 9D:
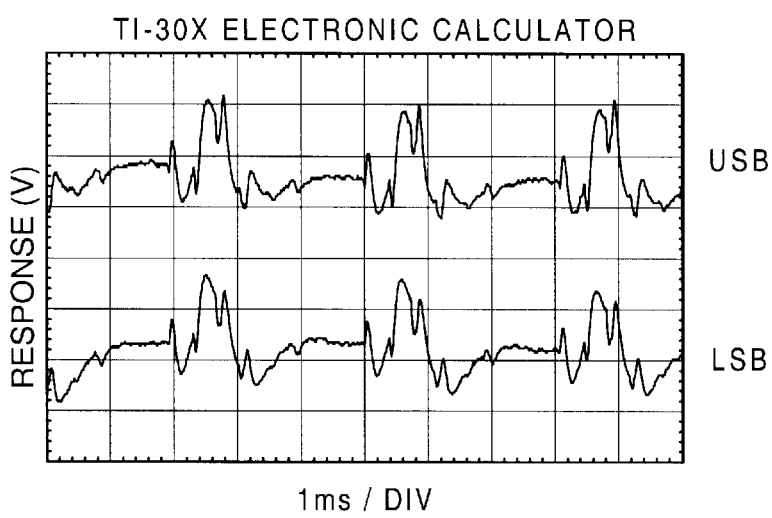
FIG. 9D plots the response to an electronic calculator for the setup of FIG. 9A.

FIG. 9D indicates yet another use for the present invention—non-contact readout of electronic devices based on the $\Delta$-RCS produced by switching transistors and their interconnects, or by variable conductivity devices such as audio transistors and their interconnects. FIG. 9D is a signature from a solar powered electronic calculator. The signature can be played into a loudspeaker, where the various processing functions can be heard as an amusing novelty. Obviously, toys can be based on this invention, such as a doll or Easter egg containing a reflector that voice modulates the radar return when illuminated by a toy radar "flashlight."

Figure 10A:
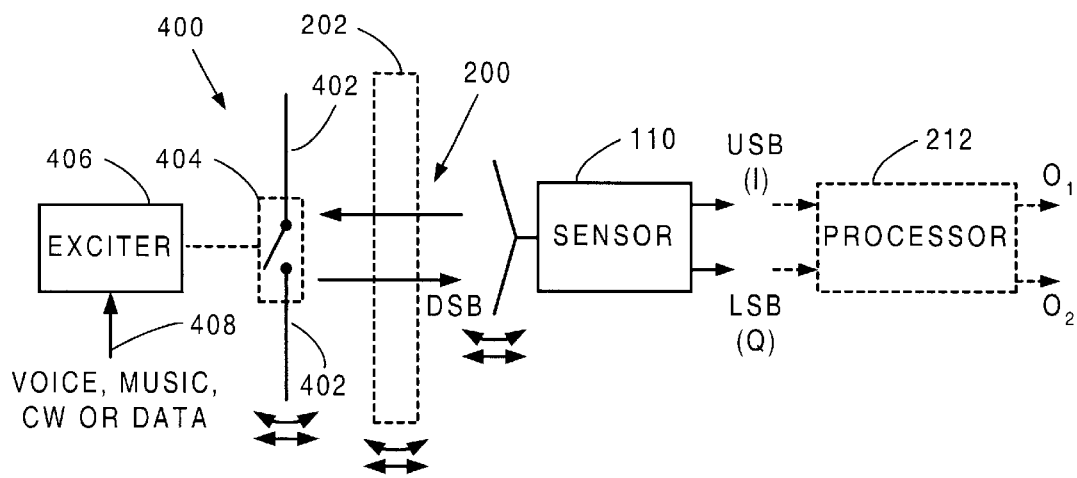
FIG. 10A shows a general arrangement for using an active reflector in a system with the sensor of FIG. 1.

FIG. 10A depicts sensor 110, which is based on FIG. 1, in a general active reflector setup. RF pulses 200 are transmitted to and reflected from active reflector 400. In some arrangements a non-opaque material 202 is in the propagation path. Any or all of the sensor 110, material 202, or reflecting objects 400 may be spatially translated or rotated as indicated by the arrows in FIG. 10A, for imaging or application specific purposes. In some cases active reflector 400 is simply translated or rotated through large distances, e.g., attached to a moving person, car, or fan blade. In other cases, active reflector 400 may be modulated in reflectance, possibly as the result of exciter or driver 406, which may be a mechanical, acoustic, magnetic, optical, or electromagnetic stimulus. The driver can be actuated by a voice, music, CW or data signal 408. Exciter 406 may be a transistor switch or other electronic driver. Processor 212 can perform various operations on the USB, LSB Doppler sidebands, such as squaring, integrating and summing to provide a signed magnitude signal. Naturally, many other processing functions are possible, including taking the FFT of the Doppler sideband signatures. A unique capability of this setup is the ability to measure the range between sensor 110 and reflector 400 from the USB/LSB phase relation, similar to that shown in FIGS. 8B, C, D.

Active reflector 400 is comprised of elements 402, switch 404 connecting the elements 402, and switch driver 406 connected to switch 404. Element 402 may be a monopole or each of two dipole antenna elements, ideally $\lambda/4$ long. Alternatively, reflector 400 may be any reflecting arrangement, including a waveguide-mounted switch or reflecting plasma such as a florescent lamp.

Figure 10B:
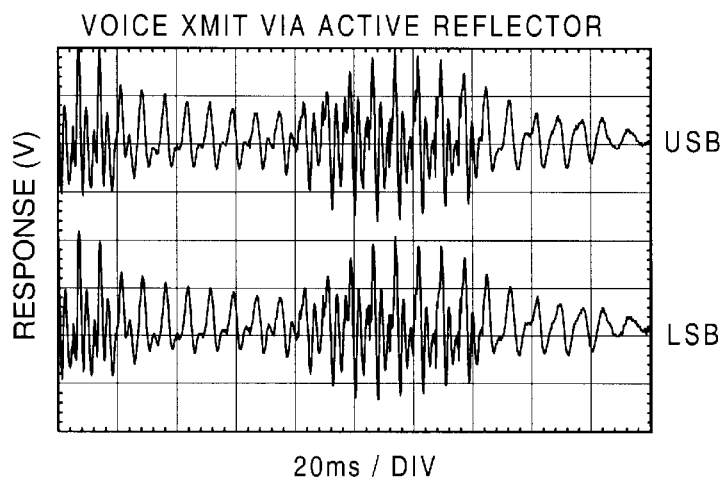
FIG. 10B plots the response of the system of FIG. 10A when the active reflector is electronically modulated with a voice.

FIGS. 10B illustrates the ability of the active reflector system of FIG. 10A to transmit voice information. This data was obtained by coupling the output of an AM radio as a driver 406 to an active reflector 400 wherein the switch 404 was formed of a silicon bipolar transistor. Uses for this configuration include RFID tags that "speak" their data when illuminated by a beam 200 from sensor 110, with a loudspeaker connected to the USB or LSB output of sensor 110.

Figure 10C:
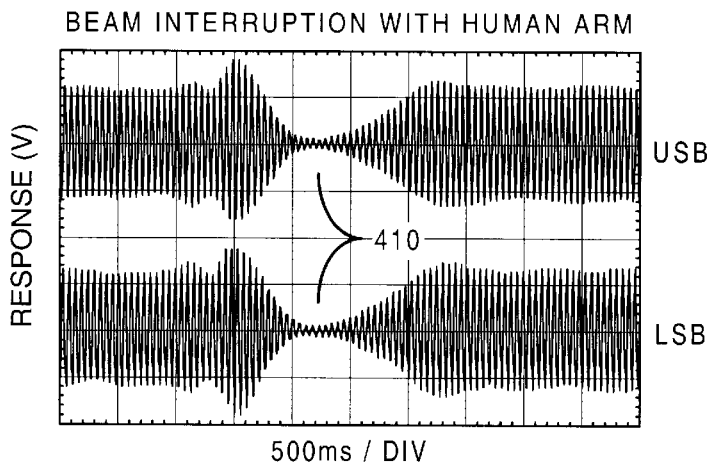
FIG. 10C plots the response when a human arm blocks the path between the active reflector and the sensor of the system of FIG. 10A.

FIG. 10C plots data for an RF beam interruption application using the setup of FIG. 10A. Here, material 202 is opaque so it blocks beam 200 whenever inserted between sensor 110 and reflector 400. The blockage 410 is seen in the data of FIG. 10C for the passage of a human arm for a sensor-reflector spacing of 0.5-meters. Applications for the RF beam interruption mode of FIG. 10A include machine safety sensors, pedestrian and automotive traffic control systems, home security and automation, etc. Obviously, more than one active reflector 400 can be used with a single sensor 110, each having a different frequency or code provided by driver 406. Driver 406 can be designed for micropower operation to allow solar power or multi-year battery operation of the active reflector.

Figure 11:
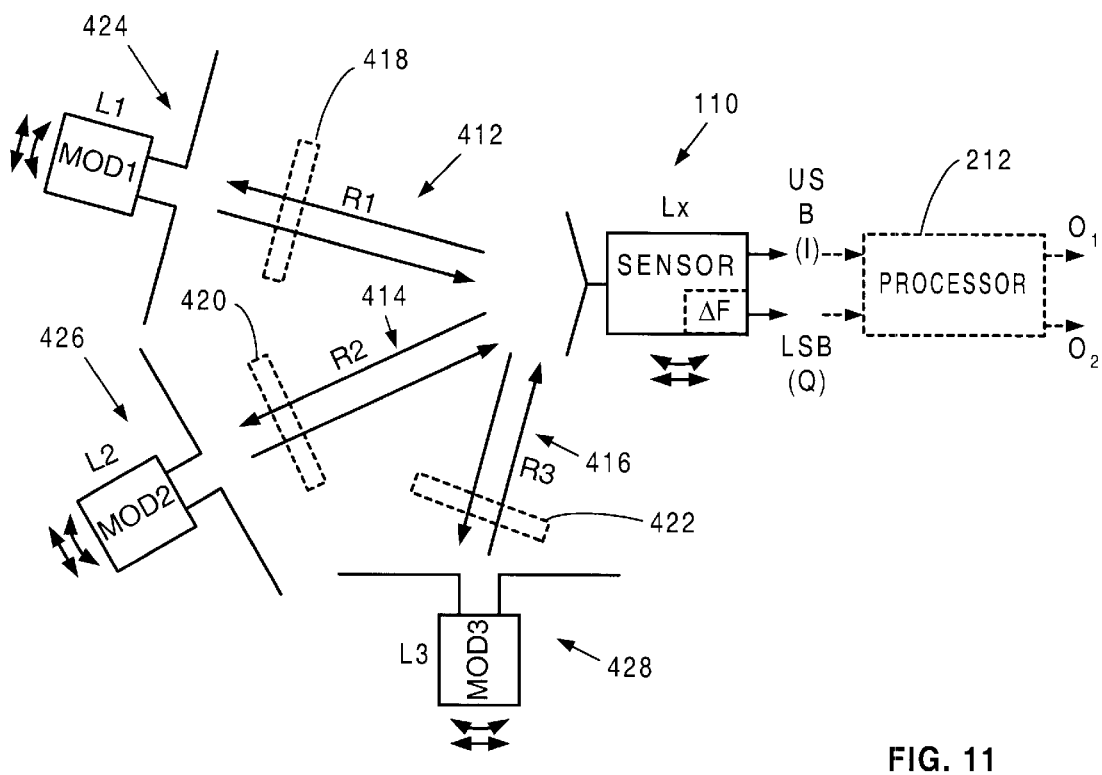
FIG. 11 is a diagram of a multi-reflector radiolocation system based on the system of FIG. 10A.

FIG. 11 depicts a radiolocation application for the system of FIG. 10A. Sensor 110 transmits beams 412, 414, and 416 to active reflectors 424, 426, and 428. There may be intervening non-opaque materials 418, 420, and 422 in the beam paths. These materials may be unintentional or unavoidable, such as building walls, or they may be placed in the beam path to obtain information about the material such as thickness or dielectric constant, or for imaging. Each active reflector may be time sequenced, multi-tone, or code modulated to allow all active reflectors to operate with sensor 110 on a non-interfering basis. The range R1, R2, R3 to each reflector is deduced from the USB, LSB phase, as seen in FIGS. 8B, C, and D. Given the knowledge of R1, R2 and R3, and the locations L1, L2, and L3, the location Lx of sensor 110 can be calculated. Depending on the number and location of the reflectors, not all ranges and locations need to be known to fix the location of other elements in the system. Potential uses for this system include machine control, inventory tracking and digital surgery. A feature of this system is its ability to obtain high resolution with relatively low RF frequencies, since the phase of the RF carrier is measured with very high resolution.

As in FIG. 8A, the center frequency of RF oscillator 12 can be changed by a small amount $\Delta F$ to offset the USB, LSB phase readings and produce a vernier effect with a range ambiguity related to $1/\Delta F$, which is much longer than the USB, LSB phase ambiguity which repeats every $\lambda/4$ in range.

Figure 12A:
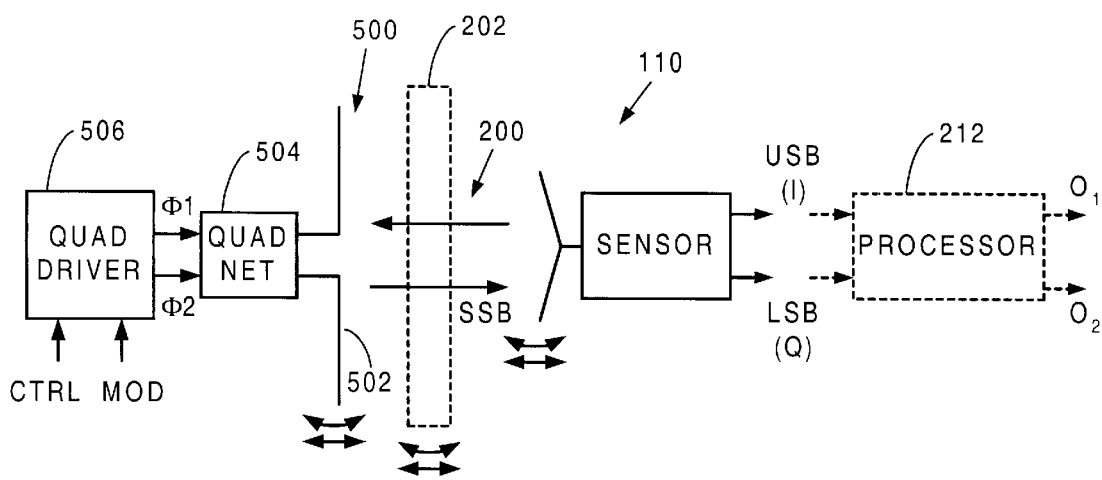
FIG. 12A is a block diagram of a single sideband active reflector in a system with the sensor of FIG. 1.

FIG. 12A depicts a sensor 110 in an active quadrature reflector setup. RF pulses 200 are transmitted to and reflected from active quadrature reflector 500 formed of elements 502 which are connected to quadrature network 504. In some arrangements a non-opaque material 202 is in the propagation path. Any or all of the sensor 110, material 202, or reflecting objects 500 may be spatially translated or rotated as indicated by the arrows in FIG. 10A, for imaging or application specific purposes. In some cases active reflector 500 is simply translated or rotated through large distances, e.g., attached to a moving person, car, or fan blade. In other cases, active reflector 500 may be modulated in reflectance, possibly as the result of quadrature driver 506, which may be a mechanical, acoustic, magnetic, optical, or electromagnetic stimulus, generally providing quadrature phase baseband data ($\Phi 1$, $\Phi 2$) in response to inputs (CTRL and MOD) to RF quadrature network 504. Processor 212 can perform various operations on the USB, LSB Doppler sidebands, such as squaring, integrating and summing to provide a signed magnitude signal. Naturally, many other processing functions are possible, including taking the FFT of the Doppler sideband signatures. A unique capability of this setup is the ability to measure the range between sensor 110 and reflector 500 from the USB/LSB phase relation, similar to that shown in FIGS. 8B, C, and D.

Figure 12B:
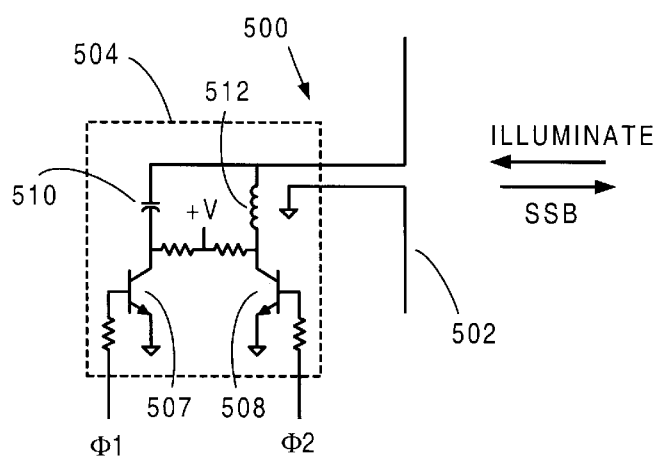
FIG. 12B is a schematic of a SSB reflector of FIG. 12A.

FIG. 12B is a schematic of one embodiment of quadrature network 504. Quadrature baseband data ($\Phi 1$, $\Phi 2$), which may be analog or digital, is provided by a quadrature driver 506 to network 504. Network 504 contains two switches comprised of bipolar transistors 507, 508 that switch phase shifting elements 510, 512 to ground, thereby modifying the phase of the reflections from antenna/reflector elements 502 of reflector 500. Clearly, other embodiments of switch elements 507, 508, whether analog or digital, and phase shift elements 510, 512 are possible within the scope of the invention.

Figure 12C:
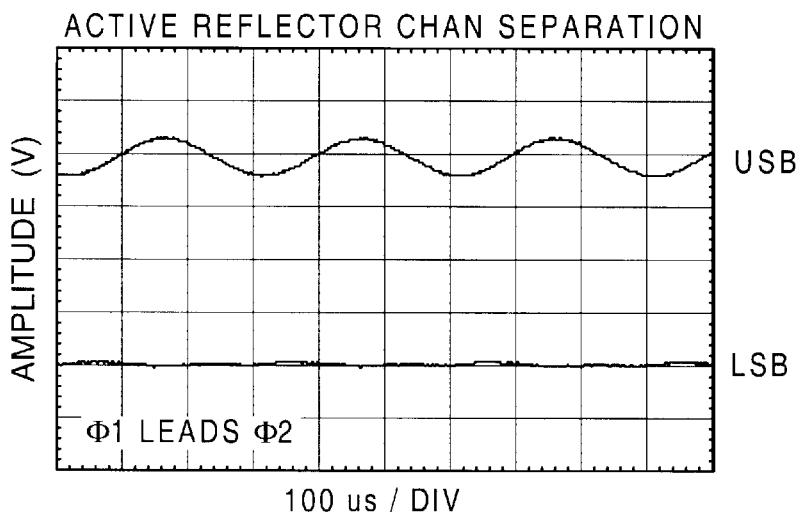
FIG. 12C plots the USB and LSB response from the sensor of FIG. 12A for phase lead modulation of the active reflector.
Figure 12D:
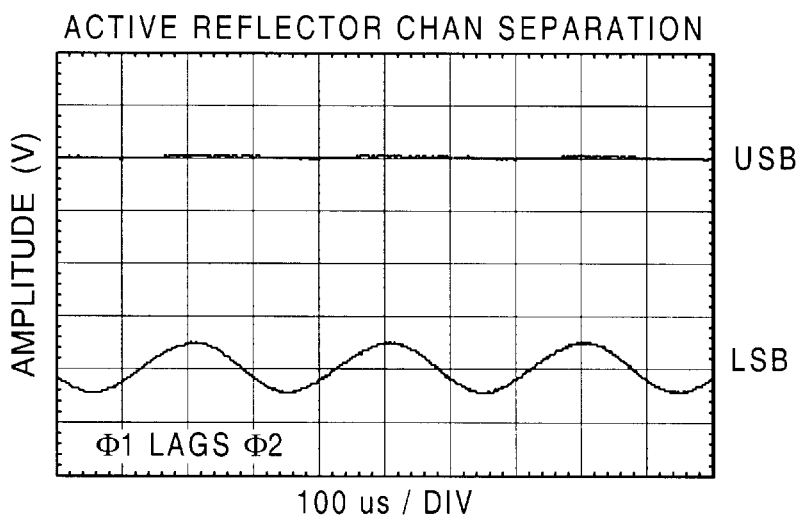
FIG. 12D plots the USB and LSB response from the sensor of FIG. 12A for phase lag modulation of the active reflector.

FIGS. 12C and D provide an indication of the USB, LSB channel separation possible with the setup of FIG. 12A. FIG. 12C shows the responses at the USB, LSB outputs of sensor 110 with $\Phi 1$ leading $\Phi 2$, thereby producing a response in the USB channel only. FIG. 12D shows the LSB response when $\Phi 1$ lags $\Phi 2$. The quad driver 506 input labeled CTRL controls the phase lead/lag condition, or sideband selection, and the quad driver input labeled MOD is the voice, data or tone modulation input, which is split into two baseband phases $\Phi 1$, $\Phi 2$ within the quad driver 506 function.

When the active reflections are set for LSB, reflector 500 appears to be moving away from sensor 110 of FIG. 12A, and when the reflections are set for USB, reflector 500 appears to be moving towards sensor 110. If the I, Q outputs of sensor 110 (as indicated in FIG. 1) are observed, reflector 500 appears to be rotating in a direction defined by the phase relation between $\Phi 1$, $\Phi 2$.

Although the invention has been described with reference to a 915 MHz system because of the enhanced materials penetration at this frequency, the principles of the invention can be applied to other frequencies, e.g., 2.4 GHz, 5.8 GHz or 24 GHz. Changes and modifications in the specifically described embodiments, including the use of multiple sensors or reflectors, can be carried out without departing from the scope of the invention which is intended to be limited only by the scope of the appended claims.

What is claimed is:

1. A microwave Doppler transceiver apparatus comprising:

a transmit clock signal generator for generating a transmit clock signal;

a pulsed transmit oscillator for producing transmitter RF bursts in response to the transmit clock signal, each burst comprising one or more cycles of a waveform;

an RF quadrature network connected to the transmit oscillator to split the transmitter RF bursts into two phases;

an antenna connected to the RF quadrature network to transmit the transmitter RF bursts, and to receive echoes of the transmitted RF bursts;

quadrature detectors connected to the RF quadrature network to detect in-phase (I) and quadrature (Q) phase components of the RF bursts;

a baseband quadrature network connected to the quadrature detectors to shift the relative phase of the I and Q components by 90 degrees and to provide first and second outputs thereof;

an SSB matrix connected to the first and second outputs of the baseband quadrature network to provide upper and lower sideband outputs.

2. The apparatus of claim 1 wherein the transmit clock signal generator is modulated in frequency, time, amplitude, or randomly dithered.

3. The apparatus of claim 1 wherein the RF quadrature network comprises a bi-directional allpass network.

4. The apparatus of claim 1 wherein the antenna is a single antenna is employed for both transmitting and receiving, or a pair of antennas, one for transmitting and the other for receiving.

5. The apparatus of claim 1 wherein the quadrature detectors are selected from I and Q RF peak-to-peak detectors, I and Q RF peak detectors, and I and Q multipliers or mixers.

6. The apparatus of claim 5 wherein the detectors have a hold time spanning more than one transmitted RF burst interval.

7. The apparatus of claim 1 wherein the RF quadrature network partially phase shifts each of the transmit and receive signals.

8. The apparatus of claim 1 wherein the SSB matrix adds the first and second outputs of the baseband quadrature network to obtain a first sideband output, and subtracts the first and second baseband quadrature outputs to obtain a second sideband output.

9. The apparatus of claim 1 further comprising a weighted direction detector connected to the outputs of the SSB matrix or to the outputs of the quadrature detectors.

10. The apparatus of claim 1 further comprising a range adjuster connected to the clock signal generator to control the maximum detection range via adjustment of the transmitted RF burst width.

11. The apparatus of claim 1 wherein the transmit clock signal generator is adjustable in frequency to provide a phase vernier for distinguishing the relative phase of the LSB and USB versus range.

12. The apparatus of claim 1 further comprising a highpass filter having a limiter feedback connected between the I and Q detectors and the baseband quadrature network to rapidly control wide voltage excursions from the I or Q detectors.

13. The apparatus of claim 1 wherein the baseband quadrature network is a dual ladder active allpass phase splitting network.

14. A short pulse microwave Doppler sensor comprising:
    a pulsed RF oscillator for providing RF bursts;
    an antenna for transmitting and receiving RF bursts;
    an RF quadrature network having a first port connected to the pulsed RF oscillator, a second port connected to the antenna, a third port connected to an I detector and a fourth port connected to a Q detector;
    first and second RF peak detectors which coherently integrate RF pulses from multiple clock repetitions and are respectively connected to the I and Q ports of the RF quadrature network.

15. The sensor of claim 14 further comprising a baseband quadrature network connected to the I and Q detectors.

16. The sensor of claim 15 further comprising an SSB matrix connected to the baseband quadrature network.

17. A method of sensing short SSB radar pulses, comprising:
    generating RF pulses;
    quadrature peak detecting the sum of RF transmitter pulses and reflected transmitter pulses from an object;
    integrating two or more RF pulses while quadrature peak detecting the pulses;
    SSB demodulating the peak detected signals.

18. The method of claim 17 further comprising controlling the maximum sensing range by selecting the transmitter RF pulse width.

19. A method of sensing SSB Doppler signals, comprising:
    transmitting RF bursts through an RF quadrature network to an object;
    receiving reflected signals from the object at the RF quadrature network;
    peak detecting quadrature RF signals from the quadrature network;
    phase shifting the detected quadrature RF signals to provide phase shifted I and Q baseband signals;
    algebraically summing the phase shifted baseband I and Q signals to form LSB and USB signals.

20. The method of claim 19 wherein the quadrature peak RF signals are integrated over multiple RF bursts.

21. A method of sensing radar target displacement, comprising:
    rectifying LSB and USB Doppler signals from respective outbound and inbound channels;
    integrating the rectified LSB and USB signals;
    algebraically summing the integrated LSB and USB signals;
    weighting the algebraic sum to reset the outbound channel with a defined signal from the inbound channel and vice-versa;
    threshold detecting the weighted sums to provide inbound and outbound detection signals for a defined amount of target movement in a given direction.

22. The method of claim 21 wherein a weighted percentage of signal in one channel will inhibit detection in the other channel.

23. A method of sensing radar target vibration, comprising:
    transmitting a pulsed RF burst;
    phase shifting the transmitted RF burst and received echo bursts to obtain multiphase RF burst signals;
    detecting the multiphase RF burst signals to produce multiphase baseband signals phase shifting the detected baseband signals;
    algebraically summing the phase shifted baseband signals to form LSB and USB signals.

24. The method of claim 23 wherein the phase of both the transmitted RF burst and the receive echo bursts is partially shifted in a single phase shift network.

25. A method of sensing bio-mechanical motion, comprising:
    illuminating a moving biological entity or organ with RF energy;
    detecting upper Doppler motion sidebands of the RF energy reflecting from or transmitted through the entity or organ in a first channel and lower Doppler motion sidebands in a second channel;
    obtaining directional motion information from the detected sidebands.

26. The method of claim 25 wherein the RF energy is pulsed.

27. The method of claim 26 wherein the RF pulse width defines the maximum sensing range.

28. The method of claim 25 further comprising sensing the human vocal cords.

29. The method of claim 28 further comprising sensing the vocal cords with a boom mounted dipole antenna.

30. The method of claim 29 further comprising co-locating an acoustic microphone with the boom mounted dipole antenna.

31. A method of sensing musical instrument vibrations, comprising:
    illuminating a vibrating component of a musical instrument with RF energy;
    detecting upper Doppler motion sidebands of the RF energy reflecting from or transmitted through the vibrating component of the instrument in a first channel and lower Doppler motion sidebands in a second channel;

obtaining vibrational motion information from the detected sidebands.

32. The method of claim 31 wherein the RF energy is pulsed.

33. The method of claim 32 wherein the RF pulse width defines the maximum sensing range.

34. The method of claim 31 wherein the musical instrument is a stringed instrument.

35. The method of claim 34 wherein the musical instrument is a guitar or a piano.

36. A method of sensing changes in radar cross-section of a plurality of objects, comprising:

illuminating at least one object with RF energy;

bringing at least one illuminated object into contact or out of contact with at least another object;

detecting at least one of the upper or lower Doppler sidebands of the RF energy reflecting from or transmitted through at least one illuminated object.

37. The method of claim 36 wherein the RF energy is pulsed.

38. The method of claim 37 wherein the RF pulse width defines the maximum sensing range.

39. The method of claim 36 wherein the objects are brought into contact by electronic means.

40. The method of claim 39 wherein the objects are brought into contact and out of contact with controlled modulation.

41. The method of claim 40 wherein the controlled modulation is selected from data, voice, or tones.

42. The method of claim 39 further comprising obtaining a readout of an electronic circuit from its change in radar cross section.

43. The method of claim 36 further comprising providing a measure of surface smoothness of the contacting objects from the change in radar cross section.

44. The method of claim 36 wherein the objects are gold or other metal particles, and further comprising applying mechanical or acoustical excitation to produce intermittent contact between the particles to change the radar cross section.

45. A method of sensing radar range, comprising:

illuminating a modulated active reflector with RF energy;

detecting upper sideband modulation of reflected energy from the active reflector in a first channel and lower sideband modulation in a second channel;

measuring the phase between the detected upper and lower sideband modulation; and calculating the range of the active reflector from the measured phase.

46. The method of claim 45 wherein the RF energy is pulsed.

47. The method of claim 46 wherein the RF pulse width defines the maximum sensing range.

48. The method of claim 45 wherein the active reflector is modulated with a tone, data, or voice.

49. The method of claim 45 further comprising positioning an intervening material before the modulated active reflector.

50. The method of claim 49 further comprising determining the dielectric constant of the intervening material.

51. The method of claim 49 wherein the frequency of the RF energy is varied by an amount ΔF to resolve range ambiguities from the resulting phase changes.

52. A method of sensing a radar beam interruption, comprising:

illuminating an active reflector with RF energy from a radar;

modulating the active reflector;

detecting a decrease in modulated reflected energy as a result of a blockage of a beam path between the active reflector and the radar.

53. The method of claim 52 wherein the RF energy is pulsed.

54. The method of claim 53 wherein the RF pulse width defines the maximum sensing range.

55. A method of sensing an RFID tag, comprising:

illuminating the RFID tag with RF energy from a radar;

modulating an active reflector within the RFID tag to reflect modulated upper and lower sidebands back to the radar;

detecting modulation in at least one of the upper and lower sidebands received by the radar from the RFID tag.

56. The method of claim 55 wherein the RF energy is pulsed.

57. The method of claim 56 wherein the RF pulse width defines the maximum sensing range.

58. The method of claim 55 wherein the RFID tag reflects tones, data, or voice to the radar.

59. A method of radiolocation, comprising:

illuminating at least two active reflectors with RF energy from a radar;

modulating the active reflectors to produce upper and lower sidebands;

detecting modulation in at least one of the upper or lower sidebands received by the radar from the active reflectors;

measuring the range to the reflectors by the phase between the detected modulation of the upper and lower sidebands;

calculating the location of at least one of the reflectors or the radar using the measured ranges.

60. The method of claim 59 wherein the RF energy is pulsed.

61. The method of claim 60 wherein the RF pulse width defines the maximum sensing range.

62. The method of claim 59 wherein the reflectors are modulated with tones, data, or voice.

63. A method of quadrature modulating an active reflector, comprising:

coupling at least two phase shift networks to the terminals of an active reflector;

switching the phase shift networks across the reflector terminals.

64. The method of claim 63 wherein the phase shift networks are switched in quadrature.

65. The method of claim 64 further comprising voice, tone or data modulation to control the switching of the phase shift networks to provide SSB or multiphase reflections.

66. The method of claim 65 wherein the active reflector further comprises an RFID tag or a toy.

67. A radar and active reflector system, comprising:

a radar for transmitting and receiving RF bursts;

a modulated active reflector for reflecting transmitted RF bursts back to the radar;

a detector within the radar for detecting at least one of the USB or LSB reflections from the active reflector.

68. The system of claim 67 wherein the active reflector is selected from an active reflector which produces SSB reflections and an active reflector which produces double sideband reflections.

69. The system of claim 68 wherein the RF burst width defines the maximum sensing range.

70. A rotating object detector, comprising:
- a radar for transmitting RF energy to and receiving reflected energy from the rotating object;
- a quadrature detector within the radar for providing I and Q outputs;
- a phase comparator to compare the phase of the I and Q outputs to determine the direction of rotation of the object.

71. The detector of claim 70 wherein the RF energy is pulsed.

72. The detector of claim 71 wherein the RF burst width defines the maximum sensing range.

* * * * *